United States Patent
Stokes

(10) Patent No.: US 10,240,031 B2
(45) Date of Patent: Mar. 26, 2019

(54) SURFACE MODIFYING AGENTS, MODIFIED MATERIALS AND METHODS

(71) Applicant: Celgard, LLC, Charlotte, NC (US)

(72) Inventor: Kristoffer K. Stokes, Charlotte, NC (US)

(73) Assignee: Celgard, LLC, Charlotte, NC (US)

( * ) Notice: Subject to any disclaimer, the term of this patent is extended or adjusted under 35 U.S.C. 154(b) by 656 days.

(21) Appl. No.: 14/157,561

(22) Filed: Jan. 17, 2014

(65) Prior Publication Data

US 2014/0206251 A1   Jul. 24, 2014

Related U.S. Application Data

(60) Provisional application No. 61/754,100, filed on Jan. 18, 2013.

(51) Int. Cl.
  *C09D 141/00*   (2006.01)
  *C08F 299/00*   (2006.01)
  (Continued)

(52) U.S. Cl.
  CPC .......... *C08L 23/10* (2013.01); *B01D 67/0093* (2013.01); *B01D 69/12* (2013.01);
  (Continued)

(58) Field of Classification Search
  CPC .. C08F 12/16; C08F 12/30; C08F 8/30; C08F 212/14; C08J 7/12; C08L 25/18;
  (Continued)

(56) References Cited

U.S. PATENT DOCUMENTS 3,203,937 A * 8/1965 Breslow ............... C08K 5/43
                                                    525/210
4,099,910 A * 7/1978 Herweh ............... C07C 247/00
                                                    552/5
(Continued)

FOREIGN PATENT DOCUMENTS

EP   0472936 B1 *  3/1992 .............. C08J 7/12
EP   0472936 A2    4/1992
(Continued)

OTHER PUBLICATIONS

"Unitary." Merriam-Webster.com. Merriam-Webster, n.d. Web. Jun. 5, 2018. (Year: 2018).*

(Continued)

*Primary Examiner* — Jeremy R Pierce
(74) *Attorney, Agent, or Firm* — Hammer & Associates, P.C.

(57) ABSTRACT

The present invention relates to surface modifying agents for polymeric and/or textile materials, methods of making and/or using a surface modifying agent to modify and functionalize polymeric and/or textile materials, and/or methods of using surface modified or functionalized polymeric and textile materials, and/or products using or incorporating surface modified or functionalized polymeric and textile materials. For example, the surface modifying agent in precursor form can be styrene sulfonyl azide monomer, polymer or copolymer capable of undergoing a chemical reaction in the presence of heat or light to form one or more styrene sulfonated nitrene monomers, polymers or copolymers, which are capable of chemically reacting with the surface of a polymeric or textile material to endow a specific or desired chemical surface functionality to the surface of a polymeric or textile material. Furthermore, the present invention is possibly preferably directed to a surface modifying agent which comprises a styrene sulfonated nitrene (Continued)

monomer, polymer or polymer containing one or more nitrene functional groups, which are capable of chemically reacting via an insertion reaction into one or more carbon-hydrogen bonds on the surface of a polymeric or textile material in order to chemically attach a specific or desired chemical functionality to the surface of a polymeric or textile material.

12 Claims, 9 Drawing Sheets

(51) Int. Cl.

| | |
|---|---|
| C08L 23/10 | (2006.01) |
| C08F 12/26 | (2006.01) |
| D06M 15/21 | (2006.01) |
| D06M 10/10 | (2006.01) |
| H01M 2/16 | (2006.01) |
| B01D 67/00 | (2006.01) |
| B01D 69/12 | (2006.01) |
| C08J 7/12 | (2006.01) |
| D06P 3/79 | (2006.01) |
| D06P 5/22 | (2006.01) |
| D06M 101/20 | (2006.01) |
| H01M 10/052 | (2010.01) |
| B01D 61/14 | (2006.01) |
| B01D 71/26 | (2006.01) |

(52) U.S. Cl.
CPC .............. *C08F 12/26* (2013.01); *C08J 7/123* (2013.01); *D06M 10/10* (2013.01); *D06M 15/21* (2013.01); *H01M 2/16* (2013.01); *B01D 61/14* (2013.01); *B01D 71/26* (2013.01); *B01D 2323/02* (2013.01); *B01D 2323/04* (2013.01); *B01D 2323/385* (2013.01); *C08F 2438/03* (2013.01); *D06M 2101/20* (2013.01); *D06M 2400/01* (2013.01); *D06P 3/798* (2013.01); *D06P 5/22* (2013.01); *H01M 10/052* (2013.01); *Y10T 428/31938* (2015.04); *Y10T 442/2262* (2015.04)

(58) Field of Classification Search
CPC .. D06M 15/21; D06M 10/10; D06M 2101/20; Y10T 428/31938; Y10T 442/2262
See application file for complete search history.

(56) References Cited

U.S. PATENT DOCUMENTS

| | | | | |
|---|---|---|---|---|
| 4,579,905 | A | * | 4/1986 | Krabbenhoft ........... C08L 69/00 525/132 |
| 5,051,312 | A | | 9/1991 | Allmer |
| 6,211,302 | B1 | * | 4/2001 | Ho ........................ C08G 81/02 525/333.5 |
| 2002/0091199 | A1 | * | 7/2002 | Babb ..................... C08G 81/02 525/194 |
| 2004/0115721 | A1 | | 6/2004 | Mao et al. |
| 2004/0242794 | A1 | | 12/2004 | Kanazawa |
| 2010/0015869 | A1 | | 1/2010 | Hartmann |
| 2011/0020917 | A1 | | 1/2011 | Wen et al. |
| 2011/0184196 | A1 | * | 7/2011 | Chidsey ................. B82Y 40/00 552/8 |
| 2013/0022876 | A1 | | 1/2013 | Stokes et al. |

FOREIGN PATENT DOCUMENTS

| | | |
|---|---|---|
| FR | 1500512 A | 3/1967 |
| GR | 1344991 A | 1/1974 |
| JP | S6341541 A | 2/1988 |
| JP | 4-90877 A | 3/1992 |
| JP | 07-151758 A | 6/1995 |
| JP | 2010-059367 A | 3/2010 |
| WO | WO 2000/26180 A1 | 5/2000 |
| WO | WO 2013012905 A2 | 1/2013 |

OTHER PUBLICATIONS

U.S. Appl. No. 61/547,812, filed Oct. 17, 2011, Stokes.
G.K. Raghuraman et al., "Attachment of Polymer Films to Solid Surfaces via Thermal Activation of Self-assembled Monolayers Containing Sulphonyl Azide Group," Langmuir Article, American Chemical Society, 26(2), (2010), pp. 769-774.
Lebo Xu et al., "Synthesis of Dual-functional Copolymer with Orthogonally Photosensitive Groups," Journal of Polymer Science, Part A: Polymer Chemistry, Wiley Periodicals, Inc., 51, (2013), pp. 1215-1222.
R. Navarro et al., "Preparation of Surface-Attached Polymer Layers by Thermal or Photochemical Activation of α-Diazoester Moieties," Langmuir Article, American Chemical Society, 29, (2013), pp. 10932-10939.
Kerstin Schuh et al., "Surface Attached Polymer Networks through Thermally Induced Cross-Linking of Sulfonyl Azide Group Containing Polymers," Macromolecules, vol. 41, No. 23, (Dec. 9, 2008), pp. 9284-9289.
Li G et al., "A facile strategy for the fabrication of highly stable superhydrophobic cotton fabric using amphiphilic fluorinated triblock azide copolymers," Polymer, Elsevier Science Publishers B.V., GB, vol. 51, No. 9, (Apr. 20, 2010), pp. 1940-1946.
Sheng Shui Zhang, "A review on the separators of liquid electrolyte Li-ion batteries," Journal of Power Sources, vol. 164, No. 1, (Jan. 1, 2007), pp. 351-364.

* cited by examiner

SURFACE MODIFYING AGENTS, MODIFIED MATERIALS AND METHODS

CROSS REFERENCE TO RELATED APPLICATIONS

The present application claims priority to and the benefit of U.S. provisional patent application Ser. No. 61/754,100, filed Jan. 18, 2013, which is hereby fully incorporated by reference herein. This application is a continuation-in-part of co-pending U.S. patent application Ser. No. 13/551,883 filed Jul. 18, 2012.

FIELD OF THE INVENTION

In accordance with at least selected embodiments, the present invention is directed to new, improved or optimized surface modifying agents; materials made or modified by such agents; methods of making and/or using such agents and/or modified materials; and/or new, improved or optimized polymeric and/or textile materials, separators, garments, fabrics, and/or the like incorporating such agents and/or modified materials. In accordance with at least certain embodiments, the present invention is directed to surface modifying agents for polymeric and/or textile materials, modified materials, methods of making and/or using the surface modifying agents to modify and/or functionalize polymeric and/or textile materials, and/or methods of using the surface modified or functionalized polymeric and/or textile materials.

In accordance with at least certain particular embodiments, the present invention is directed to a surface modifying agent, which comprises a suitable nitrene and/or carbene precursor capable of undergoing a chemical reaction, optionally in the presence of heat or light, to form one or more nitrene and/or carbene functional groups. Possibly preferred nitrene precursors include, without limitation, materials such as a sulfonyl azide-containing styrene monomer, polymer or copolymer capable of undergoing a chemical reaction in the presence of heat or light to form one or more nitrene functional groups. At least selected particular embodiments are directed to a surface modifying agent which comprises, for example, a styrene sulfonated monomer, polymer or copolymer which contains one or more sulfonyl functional groups, such as sulfonyl azide functional groups, which, upon activation, is capable of chemically reacting with the surface of a polymeric or textile material to impart a specific or desired chemical surface functionality to the surface of the polymeric or textile material.

The imparted modification or functionality may change the physical properties of the polymeric and/or textile material or allow the material to be used in a new functional role. For example, the functionality may impart a property such as hydrophilicity, hydrophobicity, oleophilicity, oleophobicity, or the like, to the polymeric and/or textile material, and/or the functionality may change the surface energy of the polymeric or textile material to modify the polymeric and/or textile material to make it suitable for a particular end use application. Furthermore, certain surface modifications may provide specific functionality for new functional roles. For example, the functionality imparted may be aimed at allowing the material to be used in applications where the material becomes interactive, for example, where it can interact with other materials, such as other molecules. Further examples include, but are not limited to, particular applications where the modified or functionalized material interacts with other materials, coatings, layers, and/or the like and may be especially suited for applications such as battery separators, barrier fabrics, membranes, base layers, layers, fabrics, textiles, and/or the like for use in electrochemical cells or batteries, textiles, garments, filtration, adsorption, testing, drug delivery, analyte sensing, medical equipment, medical diagnostics, and/or the like.

BACKGROUND OF THE INVENTION

Various methods exist to modify the physical or chemical nature of surfaces of polymeric or textile materials. Certain known modifications of surfaces of polymeric or textile materials often are fugitive and fail to permanently modify the polymeric and/or textile substrate for a variety of end use applications.

One such known method is a treatment or pre-treatment of the surface of the polymer or textile substrate, for example, using ultraviolet light (alone, without use of specialized surface modifying agents), plasma treatment, corona treatment, or fluorooxidation. Such treatments may be harsh, particularly for thin films and certain polymer classes. Using these methodologies may cause a risk of mechanical or chemical damage to the surface of the polymer substrate. Damage, in some cases, may compromise the performance of the modified polymer substrate for its intended end use application.

More generally, other such known methods of treating or pre-treating the surface of a polymer or textile substrate include, for example, coating, dip-coating, spraying, or the like, some functional material onto the surface of the polymer or textile substrate in accordance with known procedures. Such existing treatments may not be durable and may wear off of the surface of the polymeric or textile substrate over time, resulting in a polymeric or textile material that, after some time, is no longer suited for the intended end use application.

Thus, for at least certain applications or uses, there exists a need for improved methods to modify the physical and/or chemical nature of surfaces of polymeric or textile materials. In particular, a need exists for improved or novel methods for permanently modifying the polymer or textile substrate for a variety of end use applications, for surface modified polymeric or textile materials, for modified functionalized polymers, for functional polymers, for uses of such materials, and the like.

SUMMARY OF THE INVENTION

In accordance with at least selected embodiments, the present invention may provide or at least address the need for new, improved or optimized methods to modify the physical and/or chemical nature of one or more surfaces of polymeric materials, for improved or novel methods for permanently modifying the polymer substrate for a variety of end use applications, for surface modified polymeric materials, for modified functionalized polymers, for functional polymers, uses of such materials, and the like.

At least certain embodiments of the present invention may address the above needs and are directed to modified functionalized polymers, functional polymers and chemically modified substrates including modified functionalized polymers, methods of modifying a functionalized polymer and/or methods of using modified functionalized polymers to chemically react with the surface of a substrate, and/or methods of using such chemically modified substrates.

In addition, the present invention may provide an improved method to use a surface modifying agent to modify the physical and/or chemical nature of one or more surfaces (or sides) of polymeric or textile materials, and/or improved or novel methods for permanently modifying the polymer or textile substrate for a variety of end use applications.

Furthermore, the present invention may provide an improved method which uses a surface modifying agent to modify polymeric and/or textile materials, methods of making and/or using a surface modifying agent to modify and/or functionalize polymeric and/or textile materials, and/or methods of using a surface modified or functionalized polymeric and/or textile material. In addition, the present invention may provide an improved method to use a surface modifying agent to modify physical and/or chemical nature of surfaces of polymeric or textile materials, and/or improved or novel methods for permanently modifying the polymer or textile substrate for a variety of end use applications.

Possibly desirably, the surface modifying agent is an agent capable of forming a nitrene and/or carbene functional group upon reaction. The nitrene and/or carbene functional group can then be utilized to react with the surface to impart a desired functionality thereto. Possibly preferably, the surface modifying agent is an agent capable of forming a nitrene functional group upon reaction. The nitrene functional group can then be utilized to react with the surface to impart a desired modification and/or functionality thereto. In a porous surface, the imparted modification and/or functionality may be across the entire surface, not over the pores, in the pores, on the surface and down in the pores, on only one surface, on both surfaces, and/or the like.

At least selected embodiments are directed to methods of preparation of the surface modifying agent, which comprises a styrene sulfonyl azide-containing monomer. A sulfonyl azide-containing monomer can undergo a chemical reaction in the presence of heat or ultraviolet (UV) light to form a chemical species known as a nitrene. A nitrene is a reactive intermediate that is an electronically neutral chemical species with only six valence electrons. A nitrene is capable of reacting with a certain substrates, including saturated hydrocarbons as well as other C—H or heteroatomic bonds, via an insertion reaction where the nitrene inserts itself into one or more of the C—H or heteroatomic bonds of the substrate. The nitrene group on the polymer provides the reactive site where the multifunctional nitrene precursor can activate and covalently inserts itself into one or more C—H or heteroatomic bonds of a substrate for the purpose of modifying the chemical properties of the substrate.

At least selected embodiments are directed to methods of preparation of the surface modifying agent, which comprises a sulfonyl azide-containing polymer or copolymer. A sulfonyl azide-containing polymer or copolymer can undergo a chemical reaction in the presence of heat or ultraviolet light to form a chemical species known as a nitrene. A nitrene is a reactive intermediate that is an electronically neutral chemical species with only six valence electrons. A nitrene is capable of reacting with a substrate via an insertion reaction where the nitrene inserts itself into one or more of the C—H or heteroatomic bonds of the substrate. The sulfonyl azide group on the styrenic polymer or copolymer provides the reactive nitrene site that can covalently insert itself into one or more C—H or heteroatomic bonds of a substrate for the purpose of modifying the chemical properties of the substrate.

In this way, the nitrene precursor functional group serves as a reactive site or crosslinking connector to tie the sulfonyl azide-containing polymer or copolymer to a substrate for the purpose of modifying the chemical properties of the substrate. For example, when the substrate is a polymer or textile material, attachment of the styrene sulfonyl azide-containing polymer or copolymer can modify the chemical reactivity of the surface of a polymer or textile material, either by itself or admixed with one or more polymers that are selected to make a suitable interface for a desired application.

DETAILED DESCRIPTION OF THE INVENTION

Figure 1:
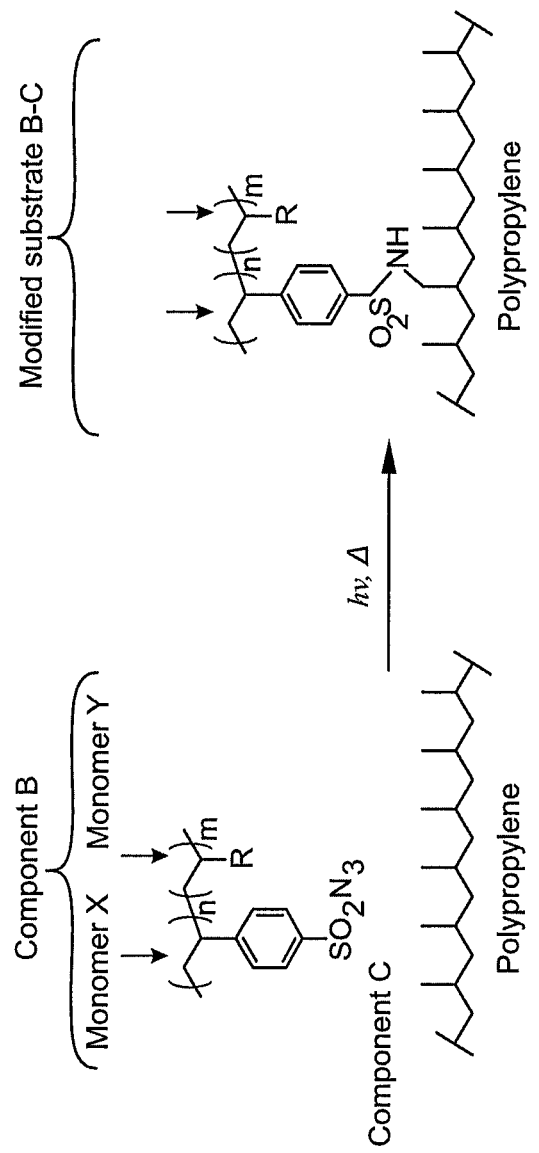
FIG. 1 is a representation of one embodiment of modifying or functionalizing the surface of a substrate to form a modified, functionalized substrate, material, layer, base, membrane, separator, porous membrane, nonporous precursor membrane, or the like in accordance with the present invention.

At least selected embodiments of the instant invention are directed to a surface modifying agent for polymeric and/or textile materials, methods of making and/or using a surface modifying agent to modify or functionalize polymeric and/or or textile materials, and/or methods of using surface modified or functionalized polymeric and/or textile materials, and/or products using or incorporating surface modified or functionalized polymeric and/or textile materials. In addition, the present invention may provide an improved method to use a surface modifying agent to modify the physical and/or chemical nature of one or more surfaces (or sides, or portions) of polymeric or textile materials, as well as improved or novel methods for permanently modifying the polymer or textile substrate or material for a variety of end use applications.

At least selected embodiments are directed to methods of preparation of the surface modifying agent, which agent may be used to modify or functionalize the surface of the polymeric or textile substrate. The surface modifying agents in certain embodiments comprise precursors that are capable of forming nitrene or carbene functional groups, reactive sites and/or crosslinking sites. In one particular embodiment, the surface modifying agent comprises a styrene sulfonyl azide-containing monomer, polymer or copolymer. The sulfonyl azide functional monomer can undergo a chemical reaction under suitable conditions, for example, in the presence of heat or ultraviolet light, to form a chemical species known as a nitrene. A nitrene (R—:N:) is a reactive intermediate that has only six valence electrons and is an electronically neutral chemical species. A nitrene is capable of reacting with a polymeric or textile substrate via an insertion reaction where the nitrene inserts itself into a C—H or heteroatomic bond of a substrate. Step 1 in the below schematic presents a generalized example of an azide, represented as R—N=N$^+$=N$^-$ (also referred to generally as R—N$_3$), forming a nitrene, R—:N:, when exposed to UV light or heat, with nitrogen gas as the byproduct.

Step 1:

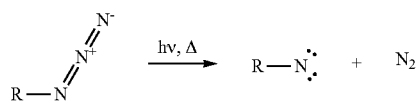

Step 2:

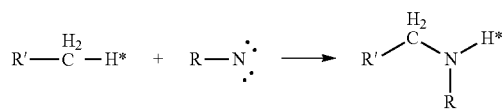

In Step 2 of the above schematic, the nitrene may then react with an alkyl or aryl component (shown here as R'—CH$_3$) by inserting itself into the example C—H bond to form R—N—CH$_2$—R'. The nitrene intermediate is the reactive site which covalently inserts itself into one or more C—H bonds in the example R'—CH$_3$ hydrocarbon substrate for the purpose of modifying the chemical properties of the example hydrocarbon substrate.

Certain embodiments of this invention are directed to methods of preparation of a sulfonyl azide containing-monomer represented as R—S=O$_2$—N$_3$, which can form a nitrene intermediate on exposure to heat or UV light. This nitrene intermediate can chemically react with the substrate inserting itself into one or more of the C—H or heteroatomic bonds for the purpose of modifying the chemical properties of the substrate. When a sulfonyl azide-containing monomer is activated to the nitrene intermediate and inserted into one or more C—H or heteroatomic bonds of a polymer or textile material, it can modify the chemical reactivity of the surface of a polymer or textile material based on the chemical properties of the sulfonated functionalized monomer. One such example is the sulfonated styrene azide monomer 4-styrenesulfonyl azide:

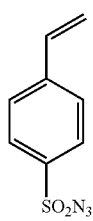

Furthermore, when a 4-styrenesulfonyl azide is exposed to UV light or heat, it can insert itself into one or more C—H or heteroatomic bonds of a polymer or textile material and can modify the chemical reactivity of the surface of a polymer or textile material. A polymer comprising monomers containing sulfonyl azide groups, when activated, can generate multiple nitrene intermediates that can insert themselves into various C—H or heteroatomic bonds along the surface of the polymer or textile material or substrate and alter the chemical reactivity of the surface of a polymer or textile material to a degree based on the composition of the sulfonyl azide-containing polymer which reacted with the surface of the polymer or textile material substrate.

A further embodiment is directed to methods of preparation of the surface modifying agent where the agent comprises a small molecule, such as a sulfonyl azide-containing small molecule. When a sulfonyl azide-containing small molecule is converted to the nitrene functionality on exposure to heat or UV light, it can insert itself into the C—H or heteroatomic bonds of a polymer or textile material and can modify the chemical reactivity or other interfacial property of the surface of a polymer or textile material based on the chemical reactivity of the selected sulfonyl azide-containing molecule. Essentially, the nitrene precursor brings along with it the chemical functionality of an attached functionality and alters the chemical reactivity or interfacial property of the surface of a polymer or textile material based on the chemical properties of the selected functionality. An example of a sulfonyl azide-containing molecule that can modify a surface with a simple aliphatic hydrocarbon can be represented as:

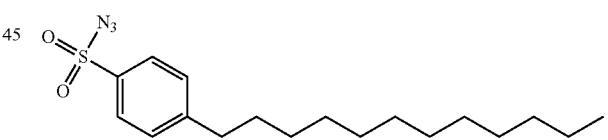

Furthermore, when one or more sulfonyl azide-containing molecules or polymers undergoes a chemical reaction to form one or more nitrenes when exposed to heat or ultraviolet light, one or more nitrenes can react at various C—H or heteroatomic bond sites of the substrate via an insertion reaction and, depending on the number of inserted nitrene groups, can alter to a higher degree the chemical functionality or interfacial properties of the polymer or textile substrate. In this way, multiple nitrene precursors may serve as reactive sites or crosslinking connectors to tie the sulfonyl azide-containing molecule or polymer to a substrate for the purpose of modifying the chemical properties of the substrate. For example, when the substrate is a polymer or textile material, attachment of one or more sulfonyl azide-containing polymers can modify the chemical reactivity of the surface of a polymer or textile material and make it suitable for an intended end use application.

One method of creating such a sulfonyl azide-containing polymer, aside from combining two monomers, is through a post-polymerization modification of a material such as polyvinyl sulfonate or a sodium polystyrene sulfonate. These types of polymers can be readily converted to a sulfonyl azide through standard chemical modification techniques as depicted below:

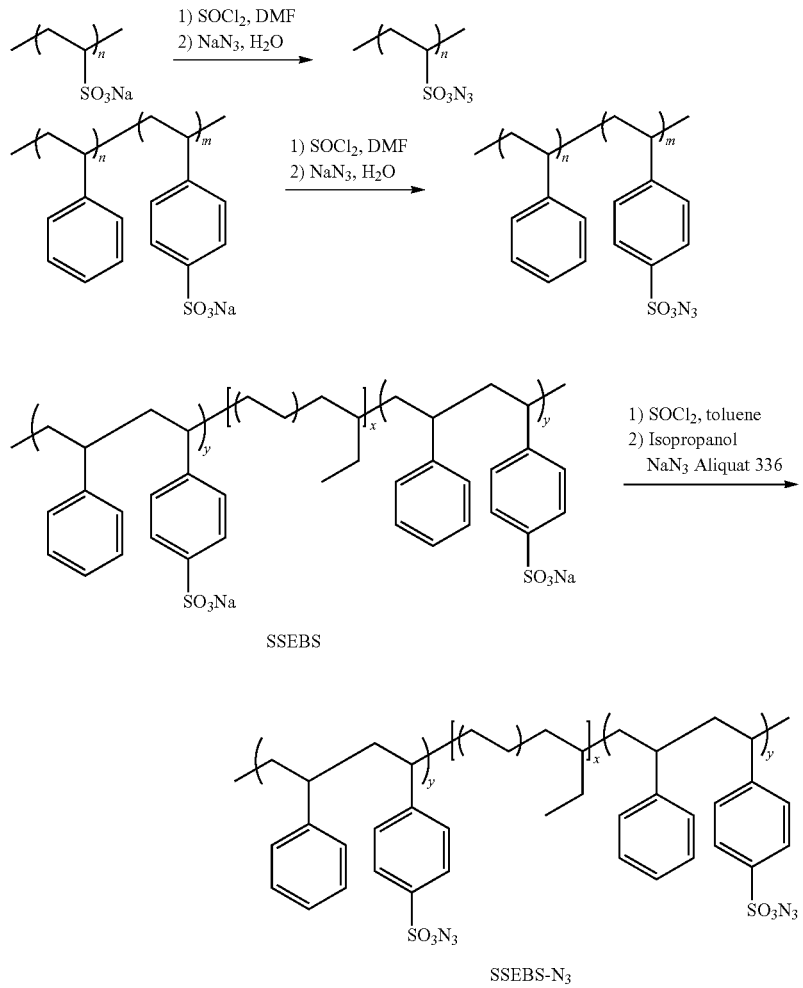

Another embodiment of the present disclosure is directed to methods of preparation of the surface modifying agent, which agent comprises a sulfonyl azide-containing polymer. Generally, in various embodiments described herein, the surface modifying agent may be referred to as either Component B (where Component B contains the crosslinking or reactive material, such as the nitrene groups derived from the nitrene precursor material, used to functionalize the polymeric or textile substrate) or Component A+B (where Component B is defined above and Component A is some functional polymer or functional group to be paired with a polymeric or textile substrate to impart a certain formulation, property, chemical nature, or the like to the polymeric or textile substrate). Further, Component B, in various embodiments herein, may simply contain a monomer X, where monomer X comprises the monomer that is a precursor to the reactive nitrene or carbene functional groups. However, Component B, in other embodiments herein, may contain monomer X+monomer Y, where monomer Y is some other monomer that may decrease the overall cost of the material (versus a Component B containing only monomer X) or may impart some property or functionality to the polymeric or textile substrate.

By way of example, a sulfonyl azide-containing polymer can be prepared by polymerizing the following monomer X,

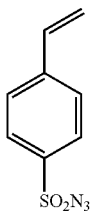

the sulfonated styrene azide monomer, in a homopolymer system. In such a homopolymer system, using the nomenclature above, Component B, the surface modifying agent, would include only a monomer X (not monomers X+Y). In other embodiments, the sulfonyl azide-containing polymer may be prepared by polymerizing monomer X, the sulfonated styrene azide monomer, by inclusion of other monomer(s) Y, where monomer(s) Y do not contain a nitrene (or carbene) precursor material. Several examples of monomer Y include, for example, styrene, pentafluorostyrene, or sodium salt of sulfonated styrene, all of which are shown, respectively, just below:

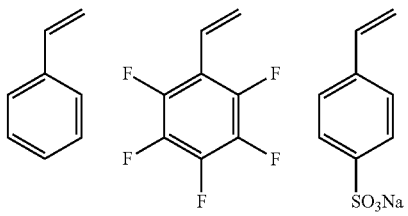

This method has the advantage that the resulting sulfonyl azide-containing polymer may be more readily tuned to the desired properties by incorporation of orthogonal functionalities or alternative surface properties that may be advantageous to further formulations.

Furthermore, other examples of monomer Y can be:

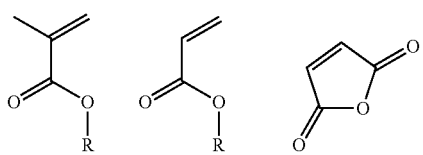

R = H, methyl, ethyl, isopropyl, butyl, hexyl, glycidyl where the first and second examples of monomer Y are a methacrylate monomer and an acrylate monomer, respectively, which can change the physical properties (such as the glass transition temperature) of the surface modifying agent based on the selection of the R group, and the third example is an anhydride which is a reactive chemical species that offers opportunities for further orthogonal chemical reactions. Additional examples of monomer Y may include, but are not limited to, 2-vinyl pyridine, 4-vinyl pyridine, and/or N-vinyl pyrrolidone.

A further example shown below is the copolymer produced from the polymerization of a sulfonylstyrene azide-containing monomer (monomer X, shown below in an amount "n") copolymerized with a second monomer (monomer Y, shown below in an amount "m") having an R group with a particular chemical functionality which can be, but is not limited to, any one of the following examples:

Polymer X-Y

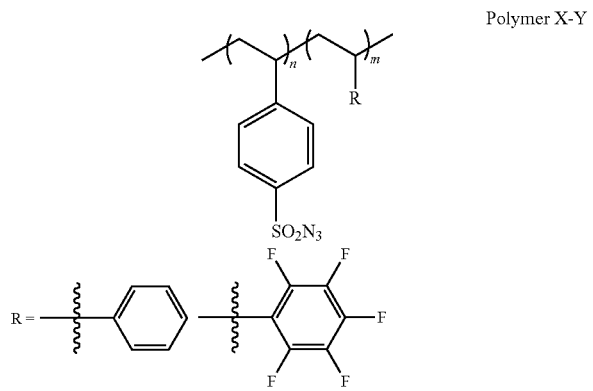

-continued

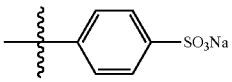

The prepared sulfonyl azide-containing copolymer can undergo a chemical reaction to form a nitrene intermediate on exposure to heat or ultraviolet light. The nitrene reacts with a polymeric or textile substrate via an insertion reaction where the nitrene functionality inserts itself into one or more of the C—H or heteroatomic bonds of the substrate. Furthermore, the ratio of n and m, which are the repeat units in the sulfonated styrene copolymer, can be $0.1 \leq n/(n+m) \leq 0.75$. Another way of stating this is that, in certain embodiments, the azide content by mole ratio of monomers $(n/(n+m))$ may be stated as a percentage, here 10-75%. In certain preferred embodiments, this azide content by mole ratio of monomers $(n/(n+m))$ may be 10-40%, and in other preferred embodiments, this azide content by mole ratio of monomers $(n/(n+m))$ may be 15-30%, while in further preferred embodiments, this azide content by mole ratio of monomers $(n/(n+m))$ may be 20-25%.

In this way, one or more of the nitrene functional groups serves as a reactive site or crosslinking connector to tie the sulfonyl azide-containing copolymer, Component B (here, containing monomers X+Y) or Component A-B, in some embodiments, to a substrate (where the polymeric or textile substrate is also referred to herein as Component C) for the purpose of modifying the chemical properties of the substrate. For example, when sulfonated styrene copolymer contains pentafluorostyrene as the R group, for example, the R group in a "Y" monomer), insertion of one or more of the nitrenes into the hydrocarbon substrate or polymer or textile material, can lower the surface energy of the surface of a polymer or textile material.

A further example of sulfonyl azide-containing functionalized material with an alternative functionality is dansyl azide, which is formed by the reaction of dansyl chloride with sodium azide as shown below:

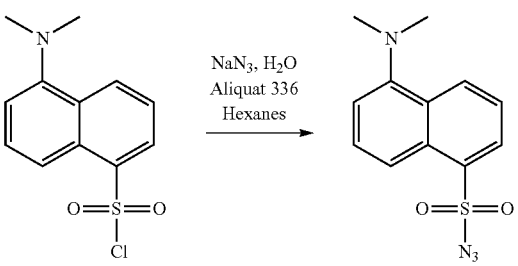 [SMILES: CN(C)c1cccc2c(S(=O)(=O)Cl)cccc12 ; CN(C)c1cccc2c(S(=O)(=O)N=[N+]=[N-])cccc12]

An interesting chemical property of dansyl azide is that it fluoresces when the sulfur atom is bound to nitrogen. Thus, dansyl azide could be useful as a biomarker for proteins. When the dansyl azide reacts in the presence of UV light or heat to form a nitrene, and the nitrene covalently bonds with a polymer or textile substrate, the substrate will become durably fluorescent, indicating that covalent attachment of one or more nitrene groups of the dansyl nitrene to the one or more C—H bonds in the polymer or textile substrate has occurred. Subsequent washings can verify the durability of the dansyl fluorophore on the substrate. The following schematic shows the formation of the nitrene on exposure to UV light or heat and the subsequent reaction of the nitrene with the polymer or textile substrate, represented here as R'—CH$_3$.

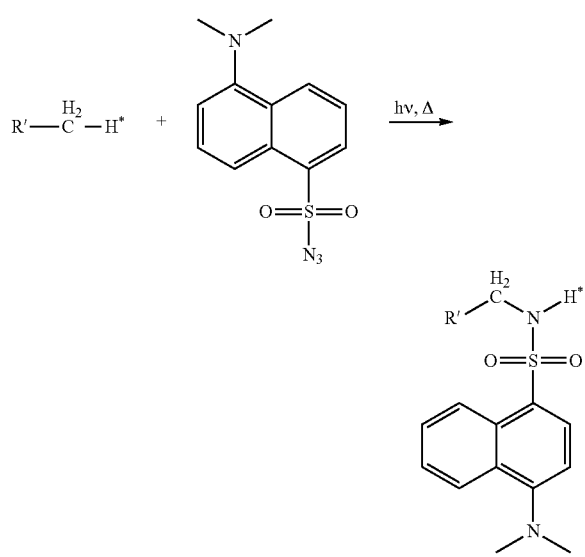

In certain embodiments, dansyl azide is applied from a hexane solution as a coating to a polypropylene film substrate, and the film substrate is then exposed to UV light, resulting in the film fluorescing intensely, without diminishing after rinsing with solvent (such as acetone) and/or water, indicating that one or more molecules are covalently bonded to the surface of the polypropylene film substrate via a nitrene intermediate.

As a further example, when sulfonyl azide-containing copolymer contains sulfonic acid salt functionalities (shown previously as a possible Monomer Y), attachment of the nitrene intermediate on the polymer or textile demonstrates a marked increase in the surface energy of the treated material. Increasing or decreasing the surface energy of the surface of polymer or textile material can alter the chemical properties of the surface of the polymer or textile material making the surface more or less chemically reactive with other chemical agents, such as dyes, finishes, waterproofing agents, antimicrobials, oils, fragrances, and the like.

Further examples of chemically modifying the properties of a polymer or textile substrate material include, but are not limited to, making the surface of the polymer or textile substrate hydrophilic, hydrophobic, oleophilic, or oleophobic by copolymerizing a sulfonyl azide-containing monomer with a monomer or a polymer which is selected based on its chemical functionality. For example, when the sulfonyl azide-containing monomer has been polymerized with a copolymer that contains a hydrophilic, hydrophobic, oleophilic, or oleophobic functional group, the chemical properties of the hydrophilic, hydrophobic, oleophilic, or oleophobic functional group can be chemically attached to the surface of the polymer or textile substrate.

Furthermore, in accordance with selected embodiments of the present invention, when the sulfonyl azide-containing monomer or polymer defined as Component B and the copolymer, monomer, polymer, or other functional group defined as Component A are combined, they may form Component A-B, which can be applied as a coating to the surface of a polymer or textile material (where the polymer or textile material may also be referred to as Component C). When the coated surface of the polymer or textile material is exposed to heat or UV light, one or more nitrene reactive groups can be generated on Component A-B (or Component B), which reactive groups can covalently bond the Component A-B (or Component B) to the surface of the polymer or textile material (Component C) to form a modified substrate A-B-C (or B-C).

In some embodiments, Component B, which contains material that produces nitrene and/or carbene groups upon activation by heat or light, comprises a monomer X or monomers X+Y. In FIG. 1, for example, the Component B comprises monomers X and Y. In FIG. 1, Component B is attached to the surface of the polymer or textile material (Component C) via a nitrene reaction in order to alter the chemical reactivity of the polymer or textile material (Component C) for a wide variety of end uses.

Figure 2:
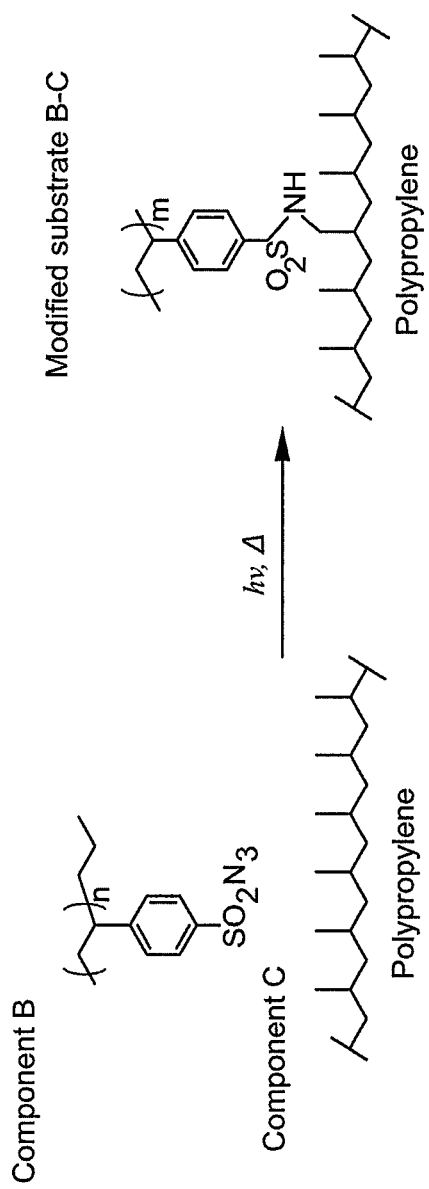
FIG. 2 is a representation of another embodiment of modifying or functionalizing the surface of a substrate to form a modified, functionalized substrate, material, layer, base, membrane, separator, porous membrane, nonporous precursor membrane, or the like in accordance with the present invention.

A similar approach, which is depicted in FIG. 2, comprises attaching Component B to the surface of the polymer or textile material (Component C) via a nitrene reaction in order to alter the chemical reactivity of the polymer or textile material (Component C) for a wide variety of end uses. In the embodiment shown in FIG. 2, Component B comprises monomer X, rather than monomers X+Y.

When the sulfonyl azide is exposed to UV light, it forms a nitrene group that can initiate an insertion reaction into a C—H or other heteroatomic bond via an addition reaction with $N_2$ as a byproduct. When Component B or Component AB is exposed to optimized UV light of a selected range of wavelengths, the modified azide with its newly generated reactive nitrene end group is capable of also functioning as a labeling reagent. The reaction of the nitrene group at a site on a surface of a substrate material inserts the functionalized Component AB (or Component B) and introduces the new, desired labeling function into Component C, the polymeric or textile substrate.

Furthermore, the insertion reaction has the benefit of not allowing the initiation of chemical radical species to propagate away from the insertion reaction site. In the case of a polyolefin substrate such as polyethylene (PE) or polypropylene (PP), this aspect is important because on exposure to UV light, PE and PP tend to crosslink or degrade once radicals are introduced into the backbone of the polyolefin polymer.

In this manner, the surface of a substrate material, such as a polymer or a textile material, can be modified or tagged with a desired chemical modality and by virtue of the nitrene group's chemical reactivity, desired surface properties can be tailor-made for a wide variety of end uses. One such example is altering the surface energy and/or the hydrophobicity and/or the oleophilicity of the surface of a polyolefin such as polypropylene by changing its typically unreactive surface into a reactive surface.

Most polyolefins are essentially "nonfunctional," as they do not readily accept chemical modification without significant consequences to the mechanical or chemical stability of the material. Nitrene-based intermediates provide the opportunity to modify nonfunctional polyolefins without the severe damage or degradation that typically occurs with many conventional surface modification approaches, damage or degradation that, in some cases, can compromise the performance of the modified polyolefin substrate for its intended end use application.

At least certain selected embodiments of the present invention are directed to modified functionalized polymers, functional polymers and chemically modified substrates including modified functionalized polymers, methods of modifying a functionalized polymer and/or methods of using modified functionalized polymers to chemically react with the surface of a substrate, and/or methods of using such chemically modified substrates. At least certain embodiments are directed to modified functionalized polymers, functional polymers, and methods of modifying functionalized polymers for chemically modifying porous, microporous, and nonporous polymer substrates and methods of using such modified substrates. In at least selected embodiments either carbene groups, R—C:, or nitrene groups, R—:N:, are reactive intermediates that can perform heteroatom insertion chemistry. Carbene or nitrene intermediates can be formed from a variety of thermal and photochemical reactions. Examples of nitrene precursors can be aryl azides, acyl azides, azidoformates, phosphoryl azides, phosphonyl, or sulfonyl azides. Examples of carbene precursors can be haloalkanes, diazoalkanes, diazoketones, diazoneacetates, Beta-keto-alpha-diazoacetates, aliphatic azo or diaziridines. And carbene materials may be generated, in some embodiments, from alpha-elimination reactions using one or more of the above-mentioned carbene precursors.

At least certain selected embodiments of the present invention address the need to modify the surface of porous polymeric substrates. At least selected embodiments of the present invention address the above need and/or are directed to modified porous polymeric membrane substrates, methods of making modified polymeric porous membrane substrates, and/or methods of using modified polymeric porous membrane substrates, chemically modified polyolefin microporous membranes, methods of making chemically modified polyolefin microporous membranes, and/or methods of using chemically modified polyolefin microporous membranes, chemically modified polyolefin microporous battery separators or battery separator membranes, methods of making chemically modified polyolefin microporous battery separators or battery separator membranes, and/or methods of using chemically modified polyolefin microporous battery separators or battery separator membranes, chemical modification of polyolefin microporous battery separators or separator membranes by the reaction of the modified functionalized polymer, which contains the carbene or nitrene intermediate, with the carbon-hydrogen bonds of the polyolefin to form carbon-carbon or nitrogen-carbon covalent bonds with the polyolefin, methods of improving the hydrophilicity or wettability of the polyolefin microporous battery separators or separator membranes in lithium ion rechargeable batteries, and/or methods of introducing crosslinking into the polyolefin microporous battery separators or separator membranes, and/or the like.

In accordance with at least selected possibly preferred embodiments of the invention, chemical modification of at least a portion of the surface of polyolefin microporous separators or membranes can be accomplished by a functionalized polymer or copolymer containing the carbene and/or nitrene intermediate with, for example, the carbon-hydrogen bonds of the polyolefin. This chemical reaction or treatment based on a functionalized polymer or copolymer containing the carbene and/or nitrene intermediate provides a method of more permanently improving the wettability of polyolefin microporous separators in lithium ion rechargeable batteries. In addition, the reaction of a functionalized polymer or copolymer containing the carbene and/or nitrene intermediate with the C—H bonds in at least a surface layer of polyolefin microporous separator membranes can be used to introduce a crosslinking functionality into the polyolefin which can be used to improve the high temperature stability of the polyolefin microporous separators or membranes.

In accordance with at least certain selected embodiments, the present invention addresses the need to modify the surface of porous polymeric substrates. At least selected embodiments of the present invention address the above need and are directed to modified porous polymeric membrane substrates, methods of making modified polymeric porous membrane substrates, and methods of using modified polymeric porous membrane substrates. More particularly, the invention is directed to chemically modified polyolefin microporous membranes, methods of making chemically modified polyolefin microporous membranes, and methods of using chemically modified polyolefin microporous membranes. Still more particularly, the invention is directed to chemically modified polyolefin microporous waterproof/breathable textile membranes, methods of making chemically modified polyolefin microporous waterproof/breathable textile membranes, and methods of using chemically modified polyolefin microporous waterproof/breathable textile membranes. In accordance with at least selected preferred embodiments, the invention is directed to chemical modification of polyolefin microporous waterproof/breathable textile membranes by the reaction of a modified functionalized polymer, which contains the carbene and/or nitrene intermediate, with the carbon-hydrogen bonds of the polyolefin, methods of decreasing the surface energy or imparting oleophobicity to waterproof/breathable textile membranes to improve the fouling resistance of waterproof/breathable textiles and/or improve the durability of the membranes' waterproofness, and/or the like.

In accordance with certain selected embodiments, the present invention addresses the need to modify the surface of polymeric textile fibers. At least selected embodiments of the present invention address the above need and are directed to modified polymeric textile fibers, methods of making modified polymeric textile fibers, and methods of using modified polymeric textile fibers. More particularly, the invention is directed to chemically modified polyolefin textile fibers, methods of making chemically modified polyolefin textile fibers, and methods of using chemically modified polyolefin textile fibers. In accordance with at least selected possibly preferred embodiments, the invention is directed to chemical modification of polymeric textile fibers by the reaction of a modified functionalized polymer, which contains the carbene and/or nitrene intermediate, with the carbon-hydrogen bonds of the polymeric textile fibers, methods of decreasing the surface energy or imparting oleophobicity, for example, to polymeric textile fibers to improve the fouling resistance of polymeric textile fibers and/or improve the durability of the textile fibers' waterproofness, and/or the like.

At least certain objects, embodiments, aspects, and/or examples of the instant invention are directed to surface modified polymeric materials, modified functionalized polymers, functional polymers, chemically modified substrates including modified functionalized polymers, methods of making and/or using surface modified polymeric materials, modified functionalized polymers, functional polymers, and/or chemically modified substrates including modified functionalized polymers, methods of modifying a functionalized polymer and/or methods of using modified functionalized polymers to chemically react with the surface of a substrate, and/or methods of using such chemically modified substrates. At least certain embodiments are directed to modified functionalized polymers, functional polymers, and methods of modifying functionalized polymers for chemically modifying porous and/or nonporous polymer substrates and/or methods of using such modified substrates. At least selected embodiments are directed to modified functionalized polymers, functional polymers, and methods of modifying functionalized polymers for chemically modifying porous and/or microporous polymer substrates and methods of using such modified substrates. At least certain embodiments are directed to modifying certain functionalized polymers to enable them to effect a change in the surface property of a substrate. In accordance with at least selected possibly preferred embodiments, the invention is directed to using a carbene and/or nitrene crosslinking modifier (Component B, which may include monomer X or monomers X+Y) to chemically modify a functionalized polymer (Component A) to form a modified functionalized polymer A-B with a carbene or nitrene functionality which can chemically react with the surface of a substrate and effect a change in the surface properties of the substrate for an intended application. In accordance with at least selected possibly preferred embodiments, the invention is directed to using a carbene and/or nitrene crosslinking modifier (Component B, which may include monomer X or monomers X+Y) to covalently modify a polymeric surface (Component C) with a functionalized polymer (Component A) to form modified substrate A-B-C. Such a modification may alter the chemical reactivity of the polymeric surface, enabling the modified substrate to have a specifically designed functionality for an intended end use or application.

Figure 3:
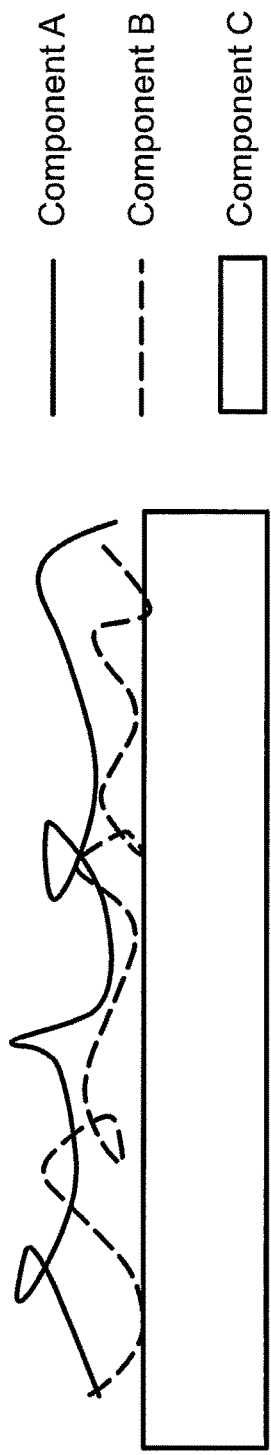
FIG. 3 illustrates a schematic side or end view representation of a modified and/or functionalized substrate, material, layer, base, membrane, separator, porous membrane, nonporous precursor membrane, or the like in accordance with the present invention.
Figure 4:
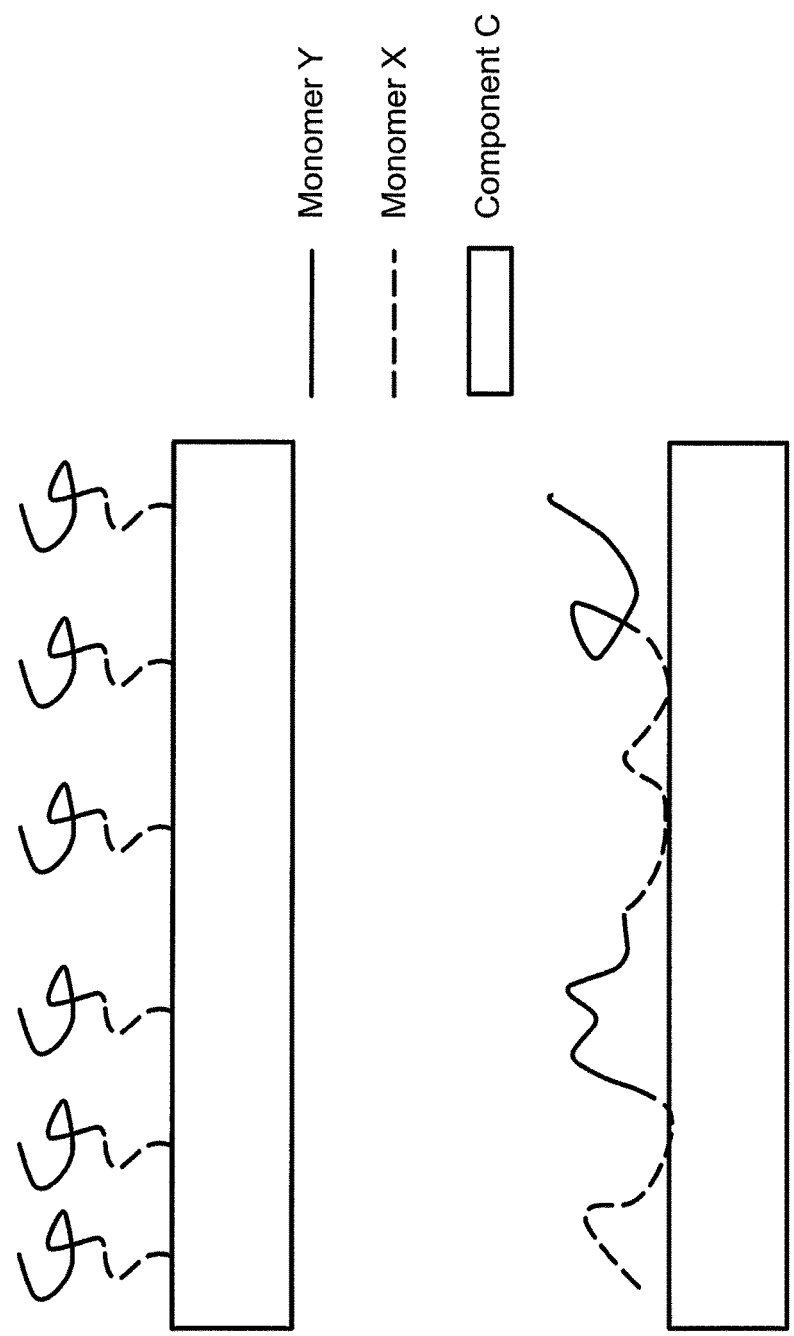
FIG. 4 illustrates two schematic side or end view representations of a modified and/or functionalized substrate, material, layer, base, membrane, separator, porous membrane, nonporous precursor membrane, or the like in accordance with the present invention.

Modified substrates in accordance with the present invention are illustrated, for example, in FIGS. 3-6. In FIG. 3, a modified substrate A-B-C comprises Component C (a polymeric or textile substrate) that has been modified by the combination of Component A (a functional polymer, a fluoropolymer, a marker, or the like) and Component B (the carbene and/or nitrene crosslinking modifier). Component A provides the modified substrate with one or more desired properties (for example, a fluorescent marker, hydrophobicity, hydrophilicity, and/or the like), while Component B provides the reactivity to modify the surface of Component C with something functional like Component A. In FIG. 4, two modified substrates comprise Component C (a polymeric or textile substrate) that has been modified by a Component B that comprises Monomers X and Y. In FIG. 4, Monomer X provides the nitrene and/or carbene reactivity for modifying the surface of Component C, while Monomer Y provides some desired property or functionality to the system.

Figure 5:
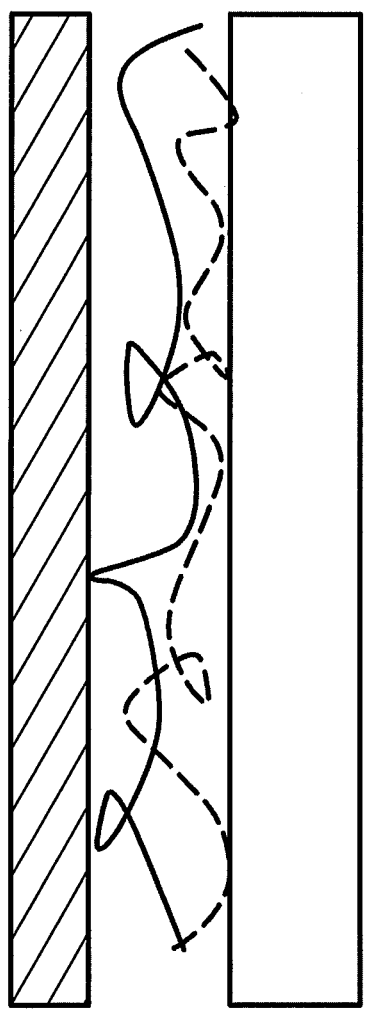
FIG. 5 illustrates a schematic side or end view representation of a modified and/or functionalized substrate, material, layer, base, membrane, separator, porous membrane, nonporous precursor membrane, or the like including an additional Component D, such as a coating, layer or the like in accordance with the present invention.
Figure 6:
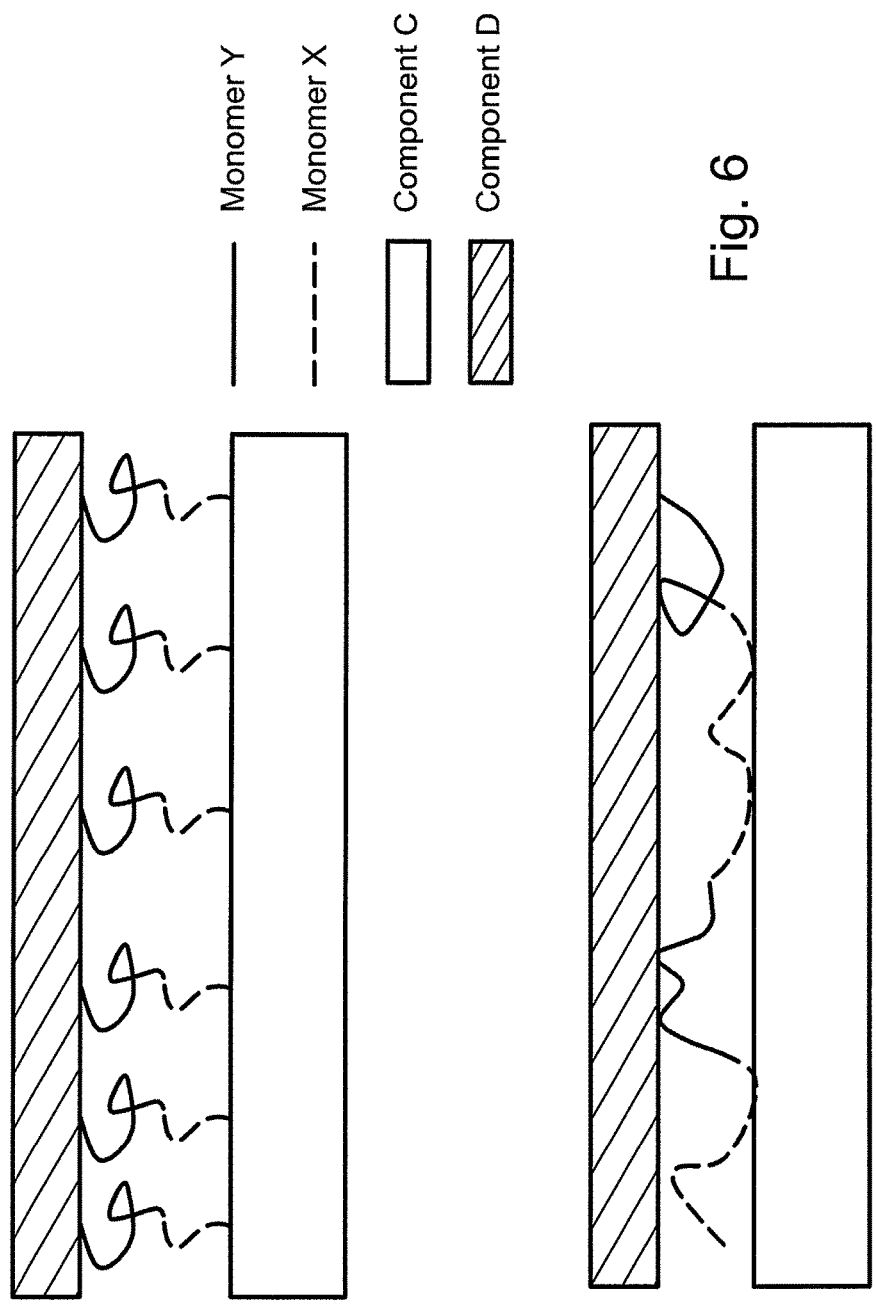
FIG. 6 illustrates two schematic side or end view representations of a modified and/or functionalized substrate, material, layer, base, membrane, separator, porous membrane, nonporous precursor membrane, or the like including an additional Component D, such as a coating, layer or the like in accordance with the present invention.

In FIG. 5, a modified substrate A-B-C-D is illustrated, where an additional component, here Component D, is added to the system. In FIG. 5, Component D may be, for example, a coating, such as a ceramic coating. Component C may be some polymeric material or textile substrate that typically is not compatible with Component D. By modifying the surface of Component C with the combination of functional polymer A (also referred to as Component A) and the modifier Component B, Component D is able to adhere to the surface of Component C more readily and more durably than without the surface modifying agents of the present invention. Similarly, in FIG. 6, two modified substrates are shown where an additional component, Component D, is added to the system. In FIG. 6, Component D may be, for example, a coating, such as a ceramic coating. By modifying the surface of Component C with a material that includes Monomer Y and Monomer X, Component D adheres more readily and more durably to the surface of Component C than it would without the surface modifying agents of the present invention.

At least certain objects, embodiments, aspects, and/or examples of the instant invention are directed to improved or novel methods for permanently modifying a polymer substrate for a variety of end uses or applications, surface modified polymeric materials, modified functionalized polymers, functional polymers, uses of such materials, and/or the like.

At least certain embodiments of the present invention may address current needs and/or are directed to new, improved, or modified surface-modified polymeric materials, modified functionalized polymers, functional polymers, and/or chemically modified substrates including modified functionalized polymers, and/or methods of modifying a functionalized polymer and/or methods of using modified functionalized polymers to chemically react with the surface of a substrate, and/or methods of using such chemically modified substrates.

More particularly, certain embodiments are directed to modifying certain functionalized polymers to enable them to effect a change in the surface property of a substrate. In accordance with at least selected preferred embodiments, the invention is preferably directed to using a nitrene (or carbene) crosslinking modifier (Component B, which may include monomer X or monomers X+Y) to chemically modify a functionalized polymer (Component A or functional or functionalized Component A) to form a modified functionalized polymer A-B, which can then chemically modify the surface of a polymer substrate and effect a change in the surface properties of the polymer substrate for an intended application.

At least selected embodiments are directed to methods of preparation of the surface modifying agent which comprises, in some embodiments, a styrene sulfonated monomer, polymer or copolymer containing a nitrene or carbene precursor functional group capable of undergoing a chemical reaction initiated by heat or UV light to form a nitrene and/or carbene entity. At least selected embodiments are directed to a surface modifying agent which comprises a styrene sulfonated monomer, polymer or copolymer which contains a nitrene entity which is capable of chemically reacting with the surface of a polymeric or textile material to endow a specific or desired chemical surface functionality to the polymeric or textile material.

At least certain embodiments are directed to methods to co-polymerize Monomer X with a Monomer Y, where Monomer Y may contain some sort of functional group that can change the surface energy and/or chemical nature of the polymeric or textile material (Component C), to form a Component B that includes Monomers X+Y. Additionally, some embodiments are directed to combining Component A, which contains a functional group specifically selected to have a desired functionality such as hydrophilicity, hydrophobicity, oleophilicity, or oleophobicity and/or selected to change the surface energy of the polymeric or textile material, with a modified styrene sulfonyl azide monomer, polymer or copolymer to form a modified functionalized A-B species capable of reacting with heat or light (such as UV light) to form a modified styrene sulfonyl nitrene monomer, polymer or copolymer with a nitrene functional group that can react chemically with a saturated hydrocarbon substrate labeled as Component C to form an A-B-C polymeric or textile material suitable for an intended end use application.

When an aliphatic or aryl azide is exposed to UV light, it forms a nitrene group that can initiate an insertion reaction into a C—H bond via an addition reaction with $N_2$ as a byproduct. With optimized exposure to UV light of a selected range of wavelengths, the modified azide with its reactive nitrene end group is capable of functioning as a crosslinking and labeling reagent. When the modified aliphatic or aryl azide also contains a specific chemical group that has the functionality of, for example, hydrophilicity, hydrophobicity, oleophilicity, or oleophobicity, the reaction of the R—:N: nitrene group at a saturated C—H site on a surface of a substrate material inserts the functionalized A-B Component and introduces the new, desired chemical functionality into Component C, the polymeric or textile substrate.

A nitrene (R—:N:) is the nitrogen analogue of a carbene and has only 6 valence electrons. Nitrenes and carbenes are reactive intermediates that may have unique reactivity towards both functional and nominally nonfunctional substrates. Although there may be methods available to modify certain functional polymeric substrates, the current invention provides a method well-suited to modify those polymeric substrates that are nonfunctional, that is, those polymeric substrates that do not contain functional groups. Most polyolefins are essentially "nonfunctional" as they do not readily accept modification without significant consequences to the mechanical or chemical stability of the material. Nitrene-based intermediates provide an opportunity to modify nonfunctional polyolefins without the severe degradation that typically occurs with many conventional surface modification approaches. Furthermore, the use of nitrene-based intermediates of the present invention may provide opportunities that can be applied to most, if not all, polymeric substrates without regard for chemical modification that is specific to a functional group. The reactive nitrene-based intermediates of the present invention have the advantage of being capable of inserting themselves into carbon-hydrogen chemical bonds of a polyolefin polymeric substrate. The special chemical reactivity of nitrene-based intermediate Component B provides a means to attach a selected functionality to the polymer or textile substrate.

Examples of azides capable of forming a reactive nitrene group include, but are not limited to, aryl azides, acyl azides, azidoformates, phosphoryl azides and sulfonyl azides. A preferred embodiment depicted below is a polystyrene sulfonyl azide polymer co-polymerized with an R-group modified polystyrene polymer with a preferred 'n/n+m' ratio of 0.1≤n/n+m≤0.75. Three examples of R functional groups for the modified polystyrene polymer which are shown below are styrene, 2,3,4,5,6-pentafluorostyrene and 4-styrenesulfonate:

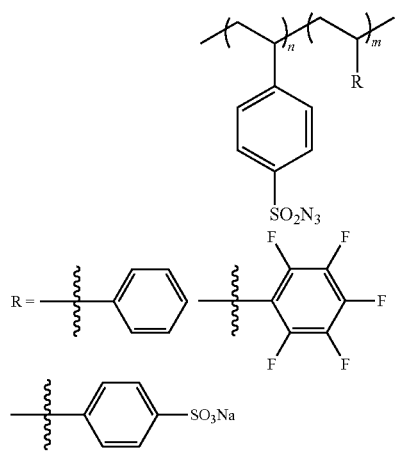

In accordance with one example of the present invention, modifier Component B with a plurality of nitrene intermediates or precursors can be mixed with one or more desired functional Component A to form a special chemical species referred to herein as a "multiple reactive site modified functionalized polymer A-B". Given the appropriate ratio and formulation conditions, this polymer A-B is capable of further reacting with a given polymer substrate that could be polyolefinic in nature, or some other synthetic or naturally derived polymer material resulting in the attachment of a specific, desired chemical functionality to the polymer substrate that tailors the chemical structure of the polymer substrate specifically for an intended end use.

A modified functionalized polysulfonated nitrene monomer, polymer or copolymer can undergo a chemical reaction, specifically an insertion reaction, inserting itself into one or more C—H bonds on the surface of the polymeric substrate resulting in a permanent, covalent modification of a surface of the polymeric substrate. Polystyrene sulfonated nitrene monomer, polymer or copolymer having a plurality of nitrene-generating species can attach to multiple sites on the surface of a polyolefin via an insertion reaction into one or more C—H bonds in the polyolefin polymeric substrate to form the resulting functionalized material (polyolefin substrate A-B-C). The resulting composite material (polyolefin substrate A-B-C) has bulk properties resembling the polyolefin substrate, but with the surface properties of polystyrene sulfonated monomer, polymer or copolymer. For instance, the post modified polyolefin surface may appear to have a much higher surface energy than normal polyolefin depending on the quality and extent of modification. Additionally, the post modified polyolefin surface may appear to have a higher or lower degree of hydrophilicity, hydrophobicity, oleophobicity or oleophilicity.

In accordance with at least selected embodiments of the present invention, the polyolefin polymeric substrate can be a microporous polyolefin membrane substrate whose surface has been chemically modified to have the functionality of Component A-B, for example, to have a higher or lower degree of hydrophilicity, hydrophobicity, oleophobicity or oleophilicity, or to have a different surface energy. Microporous polyolefin membranes tend to absorb significant amounts of oil within their pores. The present functionalized Component A-B treatment or modification can be used to modify the oleophilic surface of microporous polyolefin membranes to make it absorb less oil or to exclude oil absorption thereby creating modified microporous polyolefin membrane substrates for use in new types of separation or filtration performance of various materials.

An example of an end use application made possible by changing the oleophilicity of microporous polyolefin membranes using a functionalized Component A-B is "waterproof/breathable" outerwear where the comfort of a waterproof outerwear garment containing a microporous polyolefin membrane can be greatly improved by making the garment more breathable to enable the body moisture of the wearer to evaporate through the fabric of the waterproof outerwear. This functionality is commonly referred to as "waterproof/breathable" outerwear. Many waterproof/breathable garments incorporate nonporous materials that rely on molecular transport of water molecules to achieve breathability. There is a need to provide improved breathability by incorporating truly porous membranes that allow water vapor molecules to evaporate through diffusion in air, thus greatly increasing breathability and enhancing wearer comfort. One disadvantage of certain microporous membranes is they can become fouled by natural body oils or other oils resulting in a reduction in the waterproof performance of the membrane. This disadvantage can be overcome using the present invention to modify the surface of the microporous membrane, for example, with a fluorinated compound, to make the membrane surface oleophobic and resistant to fouling by natural body oils or other oils.

In accordance with at least selected embodiments of the present invention, applications also exist to lower the surface energy of polymeric textile fibers and/or fabrics using a functionalized Component A-B. The waterproof performance and/or stain resistance of polymeric textile fibers and fabrics is often achieved through the application of durable water repellent ("DWR") coatings and finishes. These DWR coatings and finishes have poor durability and wear off due to repeated washing and/or use. Some textile fibers and/or fabrics, for example, those made of acrylic, are less readily treated with DWR coatings and often are not used in applications where water and/or stain resistance is important. At least certain methods or embodiments of the present invention can be used to modify polymeric textile fibers and/or fabrics, for example, using a fluorinated compound, to make the polymeric textile fibers and/or fabrics permanently waterproof and/or stain resistant.

Furthermore, in accordance with at least selected embodiments of the present invention, functionalized Component A-B can be used to reduce the surface energy of a polyolefin membrane used in the wall of certain fragrance container devices. Certain fragrance container devices function through the controlled release of a fragrance material through the wall or walls of a fragrance container device. The fragrance container device typically may include a polyolefin and often is made of polyethylene. However, the release rate of the fragrance through the polyolefin membrane wall of the fragrance container device can be limited by the nonporous nature of the polyolefin membrane. Consequently, the fragrance container device must be made larger in size and/or the concentration of the fragrance in the fragrance container device must be increased (thereby increasing cost) in order to achieve the desired release rate of fragrance.

There is an economic need to use less fragrance in such fragrance container devices while achieving the desired fragrance release rate. For this reason, use of a microporous polymeric membrane as the wall material in a fragrance container device or container would facilitate the movement of fragrance through the membrane wall of the fragrance container device at a much more rapid rate. However, the use of microporous polyolefin membranes in fragrance container device applications has been limited by the tendency of the fragrance oils to leak through the membrane wall of the container. This disadvantage can be overcome by using the present invention to modify the surface energy of the microporous membrane, for example, by using a fluorinated functionalized polymer A-B to make the membrane or wall of the fragrance container device oleophobic and resistant to leakage of the fragrance oils.

In accordance with at least selected embodiments of the present invention, the modified functionalized polymer A-B can modify a polymer substrate, which has a lower or higher surface energy that—without the modified functionalized polymer A-B—typically would counteract the direct attachment of a desired chemical substance. Alternatively, modified functionalized polymer A-B can covalently modify the polymer substrate, which has a polarity that—without the modified functionalized polymer A-B—typically would limit and/or prevent the direct attachment of a desired chemical substance. In addition, the modified functionalized polymer A-B can modify the polymer substrate, which has a surface that is hydrophilic or hydrophobic—surface properties that, without the modified functionalized polymer A-B, typically would limit and/or prevent the direct attachment of a desired chemical substance. Alternatively, modified functionalized polymer A-B can modify the polymer substrate, which has a surface that is oleophilic or oleophobic—surface properties that, without the modified functionalized polymer A-B, typically would limit and/or prevent the attachment of a desired chemical substance.

At least certain embodiments are directed to modifying certain functionalized polymers for the purpose of including biologically derived polymers and small molecules for end use applications that may require biological detection or assaying. Proteins, DNA, RNA, naturally occurring polysaccharides, or other biologically relevant materials can be used for these types of applications. In such embodiments, the modification may occur by modifying certain functionalized polymers with a single carbene and/or nitrene Component B or with a mixture of multifunctional carbene and/or nitrene Component Bs. Additionally, at least certain embodiments are directed to modifying the surface of a polymer substrate with a mixture of multifunctional carbene and/or nitrene precursor Component B, which has been reacted with a desired Component A, such as a functional synthetic polymer, a small molecule, a biologically active surface modifying agent, or the like.

Modifications of the surface of the polymer substrate can be made for the purpose of changing its functionality. For example, a nominally chemically inert polymer substrate can be modified by decorating the surface of the substrate with functional groups added by functional Component A, or by modified functional Component A-B, which is designed to participate in a secondary post treatment reaction to modify a polymer substrate. Such a change alters the functionality of the polymer substrate for an intended end use application. An example of such a post treatment reaction is a textile end use application in which the surface of a textile substrate has been reacted with modified Component A-B so it can accept standard textile dyeing chemicals and procedures to generate substantially different end results.

The polymer substrate (for example, Component C) may comprise any synthetic or natural polymer or copolymer, such as olefinic, styrenic, silicone, urethane, acrylate, ester, vinyl, cellulosics, amides, aramids, ethers or copolymers and mixtures of such. Additionally, the polymer substrate can also be a crosslinked network material, such as phenol-formaldehyde resin or rubber-type materials such as butadiene, isoprene, and neoprene. Additionally, the polymer substrate can be a halogen-containing polymer such as Polytetrafluoroethylene (PTFE), Polyvinylidene fluoride (PVDF), Polyvinylidene Dichloride (PVDC), and/or Polyvinyl chloride (PVC).

The chemical structure of the modified, functional styrene sulfonated monomer, polymer or copolymer, which may be referred to as Component AB, contains the desired surface functional group (e.g., Component A) required by the polymer substrate (Component C) in the end use application. Functional polymer A or Component A may include similar polymers as the polymer substrate. In addition, functional polymer A or Component A may comprise polyamines, polyols, polyamides, and mixtures or copolymers of such.

At least selected embodiments of the present invention are directed to modified porous membranes, methods of making modified porous membranes, and methods of using modified porous membranes. More particularly, the invention is directed to chemically modified polyolefin microporous membranes, methods of making chemically modified polyolefin microporous membranes, and methods of using chemically modified polyolefin microporous membranes. Still more particularly, the invention is directed to chemically modified polyolefin microporous battery separators or battery separator membranes, methods of making chemically modified polyolefin microporous battery separators or battery separator membranes, and methods of using chemically modified polyolefin microporous battery separators or battery separator membranes.

In accordance with at least selected preferred embodiments, the invention is directed to chemical modification of polyolefin microporous battery separators or separator membranes by the chemical reaction of carbene and/or nitrene intermediates with the carbon-hydrogen bonds of the polyolefin, methods of improving the hydrophilicity or wettability of the polyolefin microporous battery separators or separator membranes in lithium-ion rechargeable batteries, methods of introducing crosslinking into the polyolefin microporous battery separators or separator membranes, and/or the like.

In accordance with at least selected preferred embodiments of the invention, chemical modification of at least a portion of the surface of polyolefin microporous separators or separator membranes can be accomplished by the chemical reaction of carbene and/or nitrene intermediates with the carbon-hydrogen bonds of the polyolefin. This chemical reaction or treatment based on carbene and/or nitrene intermediates provides a method of more permanently improving the wettability of polyolefin microporous separators in lithium-ion rechargeable batteries. In addition, the preferred reaction of carbene and/or nitrene intermediates with the C—H bonds in at least a surface layer of polyolefin microporous separator membranes can be used to introduce crosslinking into the polyolefin which can improve the high temperature stability of the polyolefin microporous separators or membranes.

An exemplary battery separator or membrane may be a single layer, multiple layer or multiple-ply battery separator made of one or more layers or plies of polyolefin porous membrane or film. The microporous membrane may be a symmetric membrane or an asymmetric membrane. The membrane may be made from one or more polyolefin polymers or blends, including, but not limited to, polyethylene (PE, including LDPE, LLDPE, and HDPE), ultra high molecular weight polyethylene (UHMWPE), polypropylene (PP), polymethylpentene (PMP), copolymers of any of the foregoing, and mixtures thereof. The membrane may be made by any suitable process including, but not limited to, a dry stretch process (also known as the CELGARD process) or a solvent process (also known as the gel extrusion or phase separation or phase inversion or extraction or wet process) or a netting (or aperture) process (in which the film is cast onto a chilled roll, the roll having a pattern that is embossed onto the film, and subsequently the embossed film is stretched (MD/TD), whereby large pores are formed along the embossed pattern). Such membranes may have a thickness of about 75 microns or less. The membrane preferably has the necessary characteristics to operate as a battery separator in a battery such as a lithium battery, more preferably a rechargeable lithium-ion battery, or the like. The chemically modified membrane of the present invention may be the outer layer of a tri-layer membrane (e.g., PP/PE/PP or PE/PP/PE) or other multi-layer membrane or separator such as a tri-layer shutdown separator.

Polyolefins are a class or group of thermoplastic polymers derived from simple olefins. Polyolefins generally include polyethylene, polypropylene, polybutylene, polymethyl pentene, and copolymers thereof. Polyolefin articles generally include fibers and films, but also include microporous films and microporous hollow fibers. "Microporous" refers to an article which has a plurality of pores with effective diameters of 1 micron or less. Hydrophobic polyolefins refer to polyolefins having surface energies equivalent to or less than the surface energy of polyethylene.

In accordance with at least certain embodiments, a polyolefin article is made more hydrophilic or wettable by chemical modification of at least a portion of the surface of the polyolefin article, such as a microporous separator or membrane by the chemical reaction of carbene and/or nitrene intermediates with the carbon-hydrogen bonds of the polyolefin. In addition, the preferred reaction of carbene and/or nitrene intermediates with C—H bonds in at least a surface layer of the polyolefin article can be used to introduce crosslinking into the polyolefin which can improve the high temperature stability, the strength, and/or the like. The foregoing hydrophilic polyolefin articles may be used in any application where a hydrophilic polyolefin is necessary or desirable, for example, air filtration, air cleaning, water filtration, water cleaning, water purification, medical equipment, separation equipment, semiconductor manufacture, battery cell separator, ultrafiltration equipment, and the like.

With regard to battery or cell separators, the chemical treatment is applied to one or both surfaces of the microporous polyolefin membrane. This treated separator is particularly suitable for lithium-ion secondary batteries. With regard to the separation, filtration, cleaning, and purification equipment, particularly where microporous polyolefin hollow fibers or flat sheet membranes are used, higher flux rates are obtainable by use of the modified materials.

Chemical modification of carbon-hydrogen and other bonds in polyolefins as a means to permanently modify the hydrophobic nature of polyolefins can be challenging due to the limited number of available chemical reactions. The carbon-hydrogen bonds are very stable, making it difficult to permanently modify polyolefins such as polypropylene and polyethylene. Polyolefins such as polypropylene and polyethylene are commonly used in microporous separator membranes in lithium-ion rechargeable batteries. An important performance property of polyolefin microporous separator membranes is easy wettability by the non-aqueous electrolyte solvents typically used in lithium-ion rechargeable batteries. Currently, various surfactants are applied as a coating to alter the hydrophobic nature of the polyolefin microporous separator membrane and increase its wettability by non-aqueous electrolyte solvents. Certain surfactant coatings may only provide temporary wettability since they are only physically adsorbed to the surface of the polyolefin microporous separator membrane.

Carbene and/or nitrene surface treatment could also be accomplished with a wide variety of small molecule functional groups. Carboxylic acids, alcohols, thiols, amines (primary, secondary, tertiary, and quaternary), guanidinium, ethers, esters, and carbonates are functional groups that can impart some hydrophilic nature to a polyolefin microporous separator membrane.

A significant increase in the wettability of polypropylene microporous separator membranes by very polar electrolytes can be achieved through the present chemical modifications of the polypropylene microporous separator membrane allowing a broader range of current and future electrolytes that can be used in lithium-ion rechargeable batteries.

For example, the wetting properties of the substrate can be drastically modified based on the substitutions to the molecular additive. Perfluoro groups could impart superhydrophobic behavior, while poly(ethylene glycol) additions can increase water wettability. Poly(dimethylsiloxane) can be used to enhance the feel of the material by making the substrate more pleasant to the touch. Furthermore, surface or bulk crosslinking of the material with a multifunctional carbene and/or nitrene precursor and treatment can lead to enhanced cross-web toughness.

Carbene and/or nitrene intermediates involving a plurality of chemical reactions can also be used to insert a specific structure designed to induce crosslinking in a polyolefin microporous separator membrane. Since crosslinks in polyolefin materials will anchor polymer molecules together, an additional advantage is gained that enhances battery safety through the reinforcement of cross-web strength of the microporous polyolefin separator membrane.

As an example, a molecule incorporating greater than one carbene and/or nitrene precursor can be applied to the polyolefin microporous separator membrane after the pores have been formed, creating a crosslinked surface. Crosslinking of the polyolefin microporous separator membrane surface can be important in high temperature end use applications. By creating a lightly crosslinked surface, the temperature resulting in loss of the structural integrity of the polyolefin microporous separator membrane can be increased and tailored to a particular temperature range based on the crosslink density. This can be accomplished as the crosslinked material can retain the molten bulk material that has no crosslinks. As the density of surface crosslink is increased, the ability to act as an exoskeleton which maintains structural integrity of the polyolefin microporous separator membrane is increased.

In addition, the crosslinking molecule incorporating greater than one carbene and/or nitrene precursor can be added to a polyolefin polymer resin during the extrusion process to form a nonporous precursor separator membrane. This precursor separator membrane is then stretched to form the pores of the microporous polyolefin membrane resulting in a microporous polyolefin membrane with improved tensile strength and melt integrity at high temperatures.

In at least selected embodiments, the separator may be a nonwoven material, such as a nonwoven made up of fibers, and chemically modified to improve the high temperature melt integrity of the nonwoven and/or to improve the wettability of the nonwoven.

In accordance with at least certain objects of the instant invention, there are provided new, improved or modified surface modified polymeric materials, modified functionalized polymers, functional polymers, chemically modified substrates including modified functionalized polymers, methods of making and/or using surface modified polymeric materials, modified functionalized polymers, functional polymers, and/or chemically modified substrates including modified functionalized polymers, methods of modifying a functionalized polymer and/or methods of using modified functionalized polymers to chemically react with the surface of a substrate, and/or methods of using such chemically modified substrates. At least certain embodiments or objects are directed to modified functionalized polymers, functional polymers, and methods of modifying functionalized polymers for chemically modifying porous and/or nonporous polymer substrates and/or methods of using such modified substrates. At least selected embodiments or objects are directed to modified functionalized polymers, functional polymers, and methods of modifying functionalized polymers for chemically modifying porous and/or microporous polymer substrates and methods of using such modified substrates. At least certain embodiments or objects are directed to modifying certain functionalized polymers to enable them to effect a change in the surface property of a substrate. In accordance with at least selected possibly preferred embodiments, the invention is directed to using a carbene and/or nitrene crosslinking modifier to chemically modify a functionalized polymer to form a modified functionalized polymer which can chemically modify the surface of a substrate and effect a change in the surface properties of the substrate for an intended application. In accordance with at least selected possibly preferred embodiments, the invention is directed to using a carbene and/or nitrene crosslinking modifier (Component B, which may include monomer X or monomers X+Y) to covalently modify a polymeric surface (Component C) with a functionalized polymer (Component A) to form an end product that is a modified functionalized polymeric material or substrate A-B-C. Such a modification may alter the chemical reactivity of the polymeric surface enabling the modified substrate to have a specifically designed functionality for an intended end use or application.

The present invention relates to new, improved or modified polymer materials, membranes, substrates, and the like and to new, improved or modified methods for permanently modifying the physical and/or chemical nature of one or more surfaces, sides or portions of the polymer substrate for a variety of end uses or applications. For example, one improved method uses a carbene and/or nitrene modifier to chemically modify a functionalized polymer to form a chemical species which can chemically react with the surface of a polymer substrate and alter its chemical reactivity. Such method may involve an insertion reaction or mechanism to modify the polymer substrate to increase or decrease its surface energy, polarity, hydrophilicity or hydrophobicity, oleophilicity or oleophobicity, and/or the like in order to improve the compatibility of the polymer substrate with, for example, coatings, materials, adjoining layers, and/or the like. Furthermore, this invention can be used to produce chemically modified membranes, fibers, hollow fibers, textiles, and the like. For example, this invention can be used to produce polyolefin microporous battery separators or membranes having improved hydrophilicity or wettability, having crosslinking in the polyolefin which can improve the high temperature stability, and/or the like.

Various embodiments of the present invention relate to a polymer comprising polymerized aryl sulfonyl azide or a copolymer thereof. In such embodiments, the aryl sulfonyl azide may be styrene sulfonyl azide. In addition, the aryl sulfonyl azide may be copolymerized with a vinylic monomer. In such cases, the vinylic monomer may be hydrophilic or hydrophobic. Also, the vinylic monomer may be styrene sulfonate or a salt thereof. Additionally, the vinylic monomer may be selected from the group consisting of a substituted styrene, acrylic acid, methacrylic acid, vinyl pyridine, vinyl pyrrolidone, acrylamide, methacrylamide, salts thereof, and the like. Further, the vinylic monomer may be substituted with a reactive group.

In various other embodiments of the present invention, a modified substrate comprises a surface modifying agent, wherein the agent comprises a first polymer that comprises polymerized aryl sulfonyl azide or a copolymer thereof, wherein at least one azide of the first polymer has been reacted with a carbon atom of the substrate to form a sulfonamide linking group. In such embodiments, the azide may be reacted with a carbon atom by exposing the first polymer and the substrate to UV light. In such embodiments, the substrate may be selected from the group consisting of a polymer, a textile substrate, a fiber, a polyolefin material, a polypropylene material, a polyethylene material, a porous polymer substrate, a nonporous polymer substrate, a microporous polymer substrate, a porous hollow fiber, a nonporous hollow fiber, a porous battery separator or membrane, a microporous polymer membrane, a film, a chemically modified polymer substrate, a polymer surface layer, a composite, combinations thereof, and the like.

Other embodiments of the present invention involve a method of modifying a substrate, which method includes contacting the substrate with a polymer that may comprise polymerized aryl sulfonyl azide or a copolymer thereof. In such methods, the substrate may be contacted with the polymer in the presence of UV light and/or heat. Additionally, in such embodiments, the polymer may be a copolymer with a vinylic monomer substituted by a reactive group, the method further comprising the step of reacting the reactive group, thereby modifying the surface of the substrate.

In accordance with at least selected oleophobic related embodiments:

1. The polymer surface (film, fiber, or bulk material) may be modified with a mixture of multifunctional carbene and/or nitrene precursor (Component B, which may include monomer X or monomers X+Y) and a desired functional synthetic monomer or polymer (Component A)
   a. The polymer surface can be any synthetic or natural polymer or copolymer, including, but not limited to, the following polymer classes: olefinic, styrenic, silicone, urethane, acrylate, ester, vinyl, cellulosics, amides, aramids, ethers and the like. The polymer surface can also be a crosslinked network material, such as phenol-formaldehyde resin or a rubber type material, such as butadiene, isoprene, and neoprene. Additionally, modifications to other halogen-containing polymers/polymer surfaces, such as PTFE, PVDF, PVDC, and PVC can be effected.
   b. Component A may be a material typically found in hydrophobic or oleophobic treatment applications. Materials such as fluorinated acrylic copolymer systems heavily used as textile treatments or chitin-based materials may provide suitable resistance to oils. Additionally, Component A may be a composite material with additional nanoparticles to generate nanoscale roughness for resistance enhancement.
   c. Component B may be a monofunctional material (f=1), or in other embodiments, is a multifunctional material (f>2.0) that has pendant functional groups tailored to generate carbene and/or nitrene species in situ.
2. The coating weight of the mixture of Components A and B can come from an organic or aqueous solution, and the surface modification of the polymer surface is further developed by heat treatment or exposure to UV light.
   a. The modification can be added to a surface in enough quantity to effect the surface properties that are required for the intended application. Typical application rates may range from 0.05 $g/m^2$ to 1.0 $g/m^2$, and may be dependent on substrate surface area, solution viscosity, and/or cure rate, amongst other factors.
   b. The ratio between Components A and B can be variable to generate the best properties. Typical A/B application weight ratio may range from 1.0 to 200.0, depending on desired surface properties and the reactivity of A with B.

In accordance with at least selected objects or embodiments, the invention provides or is directed to:

Modified polymer substrates, surface modified polymeric materials, modified functionalized polymers, functional polymers, or chemically modified substrates including modified functionalized polymers as shown or described herein.

The above invention, wherein the modified polymer substrate is a chemically modified polymer substrate.

The above invention, wherein the modified polymer substrate is at least one of a porous polymer substrate, a nonporous polymer substrate, a porous hollow fiber, a nonporous hollow fiber, a porous battery separator or membrane, a film, a chemically modified polymer substrate, a fiber, a textile, a polyolefin material, a polyolefin blend, a polypropylene material, a polyethylene material, a polymer surface layer, a composite, a combination thereof, or the like.

The above invention, wherein the modified polymer substrate is chemically modified by the chemical reaction of at least one of carbene and nitrene intermediates with the carbon-hydrogen bonds of the polymer substrate to covalently attach at least one modified functionalized polymer thereto.

Methods of making or methods of using modified polymer substrates, surface modified polymeric materials, modified functionalized polymers, functional polymers, or chemically modified substrates including modified functionalized polymers, films, hollow fibers, fibers, textiles, composites, layers, surfaces, chemically modified polyolefin microporous membranes, chemically modified polyolefin microporous battery separators or battery separator membranes, microporous battery separators or battery separator membranes, ribbed materials, combinations thereof, methods of improving the wettability of the polyolefin microporous battery separators in lithium-ion rechargeable batteries, methods of introducing crosslinking into the polyolefin microporous separators, and/or the like as shown or described herein.

The above method including at least one step of chemically modifying a polyolefin microporous battery separator membrane by the chemical reaction of at least one of carbene and nitrene intermediates with the carbon-hydrogen bonds of the polyolefin, improving the wettability of a polyolefin microporous battery separator adapted for use in a lithium-ion rechargeable battery, introducing crosslinking into a polyolefin microporous battery separator, and/or the like.

In a battery separator, the improvement comprising a polyolefin microporous membrane having at least a portion of at least one surface chemically modified.

The above separator, wherein said chemically modified polyolefin has a surface energy of equal to or greater than the surface energy of polyethylene.

The above separator, wherein said chemical modification raises the surface energy of the polyolefin to at least about 48 dynes/cm.

The above separator, wherein the polyolefin microporous membrane is chemically modified to raise the surface energy of said membrane.

The above separator, wherein said polyolefin is selected from the group consisting of polyethylene, polypropylene, blends, mixtures, and copolymers thereof.

In a battery comprising an anode, a cathode, an electrolyte, and a separator, the improvement comprising the above separator.

In a textile comprising a polyolefin microporous membrane, the improvement comprising said polyolefin microporous membrane having at least a portion of at least one surface chemically modified.

The above textile, wherein said chemically modified polyolefin membrane has a surface modification comprising a cellulosic material for the purpose of a secondary standard textile treatment, such as dyeing or other finishing step.

The above textile, wherein said chemically modified polyolefin membrane has a surface energy of equal to or less than the surface energy of polytetrafluoroethylene.

The above textile, wherein said chemical modification lowers the surface energy of the polyolefin membrane to at most about 20 dynes/cm.

A textile laminate containing at least one synthetic or natural fabric bonded with the above polyolefin membrane.

An oleophobic modified polyolefin textile membrane comprising a polyolefin microporous membrane chemically modified to lower the surface energy of said membrane, wherein said polyolefin is selected from the group consisting of polyethylene, polypropylene, and blends, mixtures, and copolymers thereof, and wherein said chemically modified polyolefin has a surface modification comprising an oleophobic polymer or combination of polymers, and/or the like.

A microporous polymer membrane having at least one surface or portion chemically modified by the chemical reaction of at least one of carbene and nitrene intermediates to covalently attach at least one modified functionalized polymer thereto to provide a durable chemical modification that provides at least one of improved wettability, reduced wettability, hydrophilicity, hydrophobicity, oleophobicity, oleophilicity, resistance to fouling by biological materials, resistance to wetting by organic solvents, resistance to wetting by methanol, ethanol, 1-propanol, acetone, and/or other polar-type solvents, and resistance to wetting by aliphatic and/or aromatic-type solvents.

NONLIMITING EXAMPLES

Example 1—Synthesis of 4-Styrene Sulfonyl Azide Monomer

In Example 1, the 4-styrene sulfonyl azide monomer was synthesized. Specifically, 34.4 grams of thionyl chloride (290 mmol) was added to a flask and chilled in an ice bath. 10 grams of sodium-4-styrene sulfonate (48.4 mmol) was added to the chilled thionyl chloride portion-wise while stirring. The solution was observed thickening into a slurry as the solids were added. 60 mL of DMF was added in 20 mL aliquots to maintain stirring and generate a homogeneous solution. The solution was stirred for 45 minutes in the ice bath, allowed to warm to room temperature, and then stirred for an additional 1-2 hours. Once complete, the reaction product was poured onto ice (about 200 grams), and the mixture was extracted with ethyl acetate (3×50 mL). The sulfonyl chloride layer was collected, dried over magnesium sulfate, and concentrated to 7.24 grams of a light yellow-orange oil.

The sulfonyl chloride (35.1 mmol) obtained from the previous step was dissolved in acetone and placed in an ice bath. 20 mL ionized $H_2O$ was added, followed by the portion-wise addition of 2.39 grams of sodium azide (36.9 mmol) over a time period of 5 minutes. The reaction was allowed to stir for 5 days, at which point the solution was washed with ethyl acetate (3×20 mL). The resulting organic portions were collected, dried over magnesium sulfate and concentrated to a light yellow oil (7.21 g received). This light yellow oil constituted the 4-styrene sulfonyl azide monomer.

Example 2—Synthesis of Styrene-Based Polymer Containing 4-Styrene Sulfonyl Azide The sulfonyl azide monomer produced in Example 1 just above (1.5 grams, 7.1 mmol) was added to a flask with a variety of desired comonomers (described in more detail below) (7.1 mmol) with a chain transfer agent. Here, the particular chain transfer agent used was 2-cyano-2-propyl-dodecyltrithiocarbonate (28 mg, 0.08 mmol). An initiator (here, 4,4'-Azobis(4-cyanovaleric acid)) (42 mg, 0.15 mmol) was separately dissolved in DMF (3 mL) solution added to the polymerization flask. The polymerization flask was then sealed with a rubber septum and the solution sparged with nitrogen for 5 minutes. Next, the polymerization flask was put in a constant temperature bath at 60° C. for 5 hours. After the polymerization proceeded, the reaction was quenched by exposure to oxygen and precipitated in a suitable solvent to recover the sulfonyl azide polymer.

Comonomers that were polymerized with the sulfonyl azide monomer included 2,3,4,5,6-pentafluorostyrene, styrene, and 4-styrenesulfonate. In the case of the 4-styrenesulfonate polymerization, additional DMF was required to help dissolve the solid 4-styrenesulfonate materials.

Example 3—General Activation of Sulfonyl Azide Polymers to Form Nitrene and Reaction with Substrate with UV Exposure Formulation and activation of the sulfonyl azide materials was performed by dissolution in acetone with an appropriate polymer for the desired surface modification, typically in a 1:1-1:10 sulfonyl azide: functional polymer ratio by weight. The solution was applied to a substrate, and the solvent was allowed to dry. The resulting thin film and substrate were exposed for 15-45 seconds under a high intensity, long-wave UV spotlight, and rinsed again with acetone to remove any physisorbed materials. In some instances, good results were obtained at 254 nm wavelength UV cure.

Figure 7:
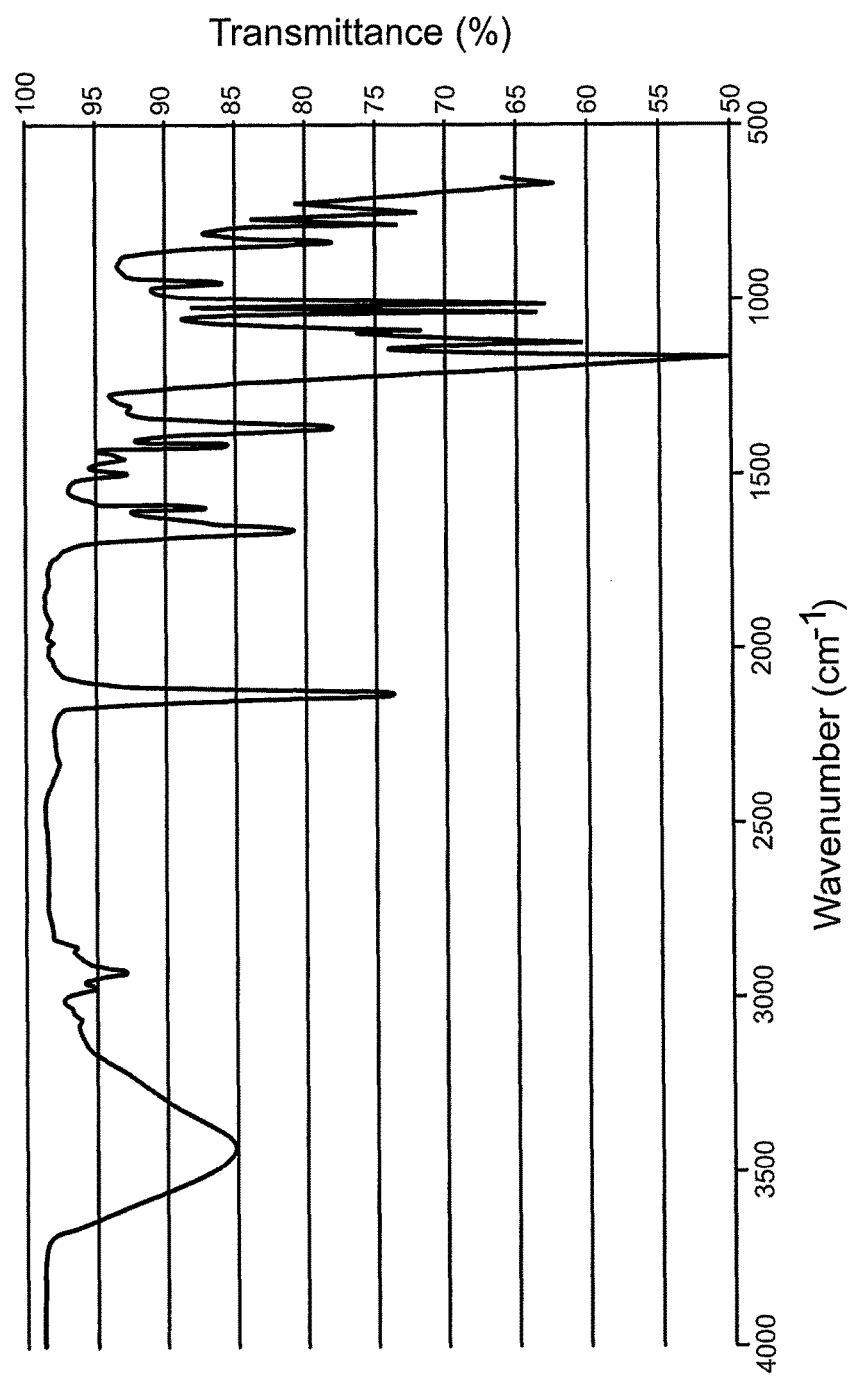
FIG. 7 is an FTIR spectrum of material made in accordance with various embodiments of the present invention.

The activated sulfonyl azide polymers were studied using various analysis techniques. By way of Example, FIG. 7 illustrates a graph of the FTIR spectrum of a polymer formed including about 50% monomer content of the sulfonyl azide monomer and about 50% monomer content of the 4-styrenesulfonate comonomer. By way of example only, FIG. 7, shows a peak between 2000 and 2500 $cm^{-1}$, which peak likely is correlated to the azide content of the polymer.

Figure 8:
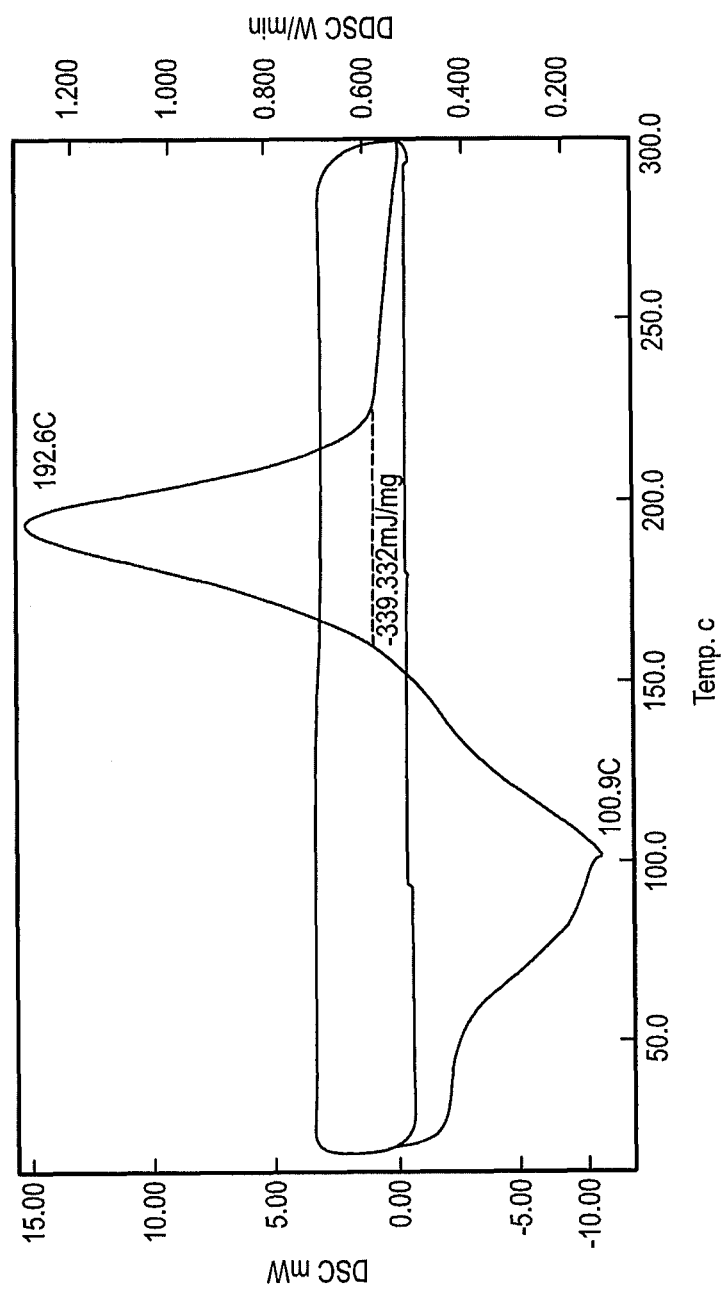
FIG. 8 is a DSC curve representing a material made in accordance with various embodiments of the present invention.

Additionally, FIG. 8 illustrates a DSC curve for the polymer formed including about 50% monomer content of the sulfonyl azide monomer and about 50% monomer content of the 4-styrenesulfonate comonomer. This calorimetry curve shows, for example, water escaping at about 100° C. and then the nitrene activation and resulting loss of nitrogen just above 190° C. This temperature may be considered the nitrene activation temperature in this particular example.

Figure 9:
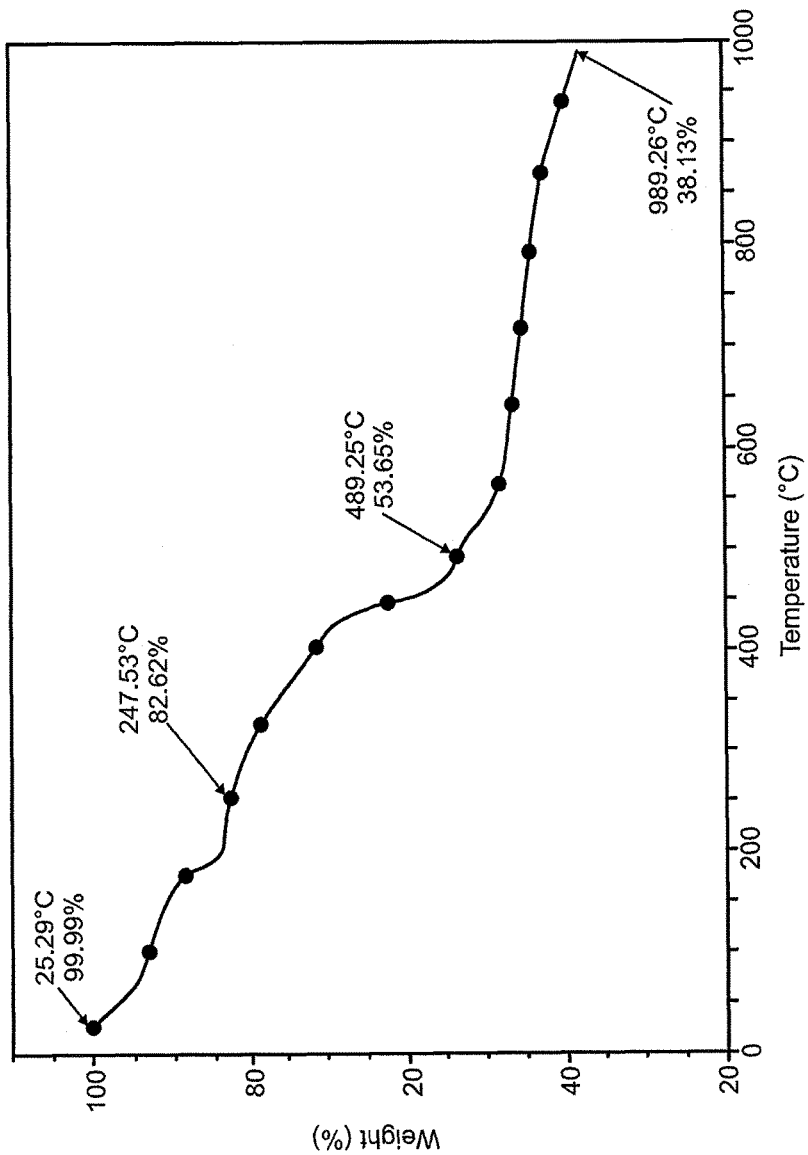
FIG. 9 is a representation of thermogravimetric analysis of a material made in accordance with various embodiments of the present invention.

FIG. 9 illustrates a graph of the thermogravimetric analysis performed on the polymer that was formed including about 50% monomer content of the sulfonyl azide monomer and about 50% monomer content of the 4-styrenesulfonate comonomer. This analysis of the polymer shows the decomposition of the polymer at various temperatures, and the nitrene generation can also be gleaned from this graph. For example, at various temperatures, nitrene generation is observed, correlated to the weight loss of the polymer.

Example 4—Reactive Dyeing of Polypropylene Nonwoven

Poly(sodium styrene sulfonate-co-styrenesulfonyl azide) was synthesized with a 37% sulfonyl azide monomer content, and 210 mg were dissolved in 12.5 grams of water at 70° C. To this solution was added 440 mg of 50 wt % branched polyethyleneimine solution (BPEI). Next, 2.98 grams of acetone was added for wetting purposes. The solution was applied to a polypropylene nonwoven material (100 grams per square meter (gsm)), and after exposure to the solution, the substrate was dried in a convection oven at 110° C. for approximately 5 minutes. The dried substrate was then exposed to 0.2 $J/cm^2$ of 254 nm UV radiation. Those materials were then exposed to a 5 mg/mL solution of Drimaren Navy reactive dye. Results from these prepared samples demonstrated spotty, but durable coloration of the nonwoven. By adding an extra 440 mg BPEI solution, the results were better, creating an even and durable blue color on the nonwoven material. The untreated sections of the nonwoven were also exposed to the dyeing solution, but were uncolored through the process.

Example 5—Durable Oil Repellency of Polypropylene Nonwoven

Poly(sodium styrene sulfonate-co-styrenesulfonyl azide) was synthesized with a 50% sulfonyl azide monomer content, and 102 mg were dissolved along with 1.5 mL TG-8731 (20 wt %, Daikin) fluoropolymer in 3 mL of water and 1 mL of acetone. A polypropylene nonwoven (45 gsm) was treated with this solution and dried in a convection oven at 115° C. for 5 minutes. Once dry, the substrate was exposed to long wavelength UV light for 5 minutes. After UV cure, the samples were exposed to a stirring acetone bath to strip any materials that are not covalently attached. The samples were again dried for 5 minutes at 115° C. and tested for dodecane repellency after the acetone rinse. All four samples demonstrated dodecane repellency after the acetone stripping step. Control samples demonstrated no dodecane repellency during the entire process.

In accordance with at least selected embodiments, aspects, objects, or the like, the present invention is directed to new, improved or optimized surface modifying agents, materials made or modified by such agents, and/or methods of making and/or of using such agents and/or modified materials, and/or to new, improved or optimized polymeric and/or textile materials, separators, garments, fabrics, and/or the like incorporating such agents, modified materials, layers, base layers, precursors, and/or the like. In accordance with at least certain embodiments, the present invention is directed to surface modifying agents for polymeric and/or textile materials, modified materials, and/or methods of making and/or using the surface modifying agents to modify and functionalize polymeric and/or textile materials, and/or methods of using the surface modified or functionalized polymeric and/or textile materials.

In accordance with at least certain particular embodiments, the present invention is directed to a surface modifying agent, which comprises a suitable nitrene and/or carbene precursor capable of undergoing a chemical reaction, optionally in the presence of heat or light, to form one or more nitrene and/or carbene functional groups. Possibly preferred nitrene precursors include materials such as a styrene sulfonyl azide monomer, polymer or copolymer capable of undergoing a chemical reaction in the presence of heat or light to form one or more nitrene functional groups. At least selected particular embodiments are directed to a surface modifying agent, which comprises a styrene sulfonated monomer, polymer or copolymer which contains one or more sulfonyl azide functional groups which, upon activation, is capable of chemically reacting with the surface of a polymeric or textile material to endow or impart a specific or desired chemical surface functionality to the surface. At least certain possibly preferred embodiments are directed to a surface modifying agent which comprises a styrene sulfonated monomer, polymer or copolymer which contains one or more sulfonyl functional groups capable of chemically reacting with the surface of a polymeric or textile material to endow or impart a desired chemical functionality to the polymeric or textile material.

The imparted modification or functionality may change the physical properties of the material or allow the material to be used in a new functional role. For example, the functionality may impart a property such as hydrophilicity, hydrophobicity, oleophilicity, and/or oleophobicity, and/or may change the surface energy of the polymeric or textile material to covalently modify the polymeric or textile material, for example, to make it suitable for a particular end use application. Furthermore, certain surface modifications can provide specific functionality for new functional roles. For example, the functionality imparted can be aimed at allowing the material to be used in applications where the material becomes interactive, for example, where it can interact with other materials such as other molecules. Further examples include, but are not limited to, particular applications where the modified or functionalized material interacts with other materials, coatings, layers, and/or the like and may be especially suited for applications such as battery separators, barrier fabrics, membranes, base layers, layers, fabrics, textiles, and/or the like for use in electrochemical cells or batteries, textiles, garments, filtration, adsorption, testing, drug delivery, analyte sensing, medical equipment, medical diagnostics, and/or the like.

The present application is generally related to each of U.S. provisional patent application Ser. No. 61/508,725, filed Jul. 18, 2011, U.S. patent application Ser. No. 13/551,883, filed Jul. 18, 2012, and U.S. provisional patent application Ser. No. 61/547,812, filed Oct. 17, 2011, all and each of which are hereby fully incorporated by reference herein.

In accordance with at least selected embodiments, aspects, objects, or the like, the present invention is directed to new, improved or optimized surface modifying agents; materials made or modified by such agents; methods of making and/or using such agents and/or modified materials; and/or new, improved or optimized polymeric and/or textile materials, separators, garments, fabrics, and/or the like incorporating such agents and/or modified materials; to surface modifying agents for polymeric and/or textile materials, modified materials, methods of making and/or using the surface modifying agents to modify and/or functionalize polymeric and/or textile materials, and/or methods of using the surface modified or functionalized polymeric and/or textile materials; to a surface modifying agent which comprises a suitable nitrene and/or carbene precursor capable of undergoing a chemical reaction, optionally in the presence of heat or light, to form one or more nitrene and/or carbene functional groups; to possibly preferred nitrene precursors including, without limitation, materials such as a sulfonyl azide-containing styrene monomer, polymer or copolymer capable of undergoing a chemical reaction in the presence of heat or light to form one or more nitrene functional groups; to a surface modifying agent which comprises, for example, a styrene sulfonated monomer, polymer or copolymer which contains one or more sulfonyl functional groups, such as sulfonyl azide functional groups, which, upon activation, is capable of chemically reacting with the surface of a polymeric or textile material to impart a specific or desired chemical surface functionality to the surface of the polymeric or textile material; to changing the physical properties of the polymeric and/or textile material or allow the material to be used in a new functional role; the functionality may impart a property such as hydrophilicity, hydrophobicity, oleophilicity, oleophobicity, or the like, to the polymeric and/or textile material, and/or the functionality may change the surface energy of the polymeric or textile material to modify the polymeric and/or textile material to make it suitable for a particular end use application; to provide specific functionality for new functional roles; the functionality imparted may be aimed at allowing the material to be used in applications where the material becomes interactive, for example, where it can interact with other materials, such as other molecules; to particular applications where the modified or functionalized material interacts with other materials, coatings, layers, and/or the like and may be especially suited for applications such as battery separators, barrier fabrics, membranes, base layers, layers, fabrics, textiles, and/or the like for use in electrochemical cells or batteries, textiles, garments, filtration, adsorption, testing, drug delivery, analyte sensing, medical equipment, medical diagnostics, and/or the like; and/or the like.

Other objects, embodiments, aspects, or examples of the present invention may be shown or described in the drawings, the detailed description or the claims. Many other variations or modifications of the present invention are possible to the skilled practitioner in the field in light of the teachings herein. It is therefore understood that, within the scope of the claims, the present invention can be practiced other than as herein specifically described.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A battery comprising:
   an anode;
   a cathode;
   an electrolyte; and
   a modified substrate comprising:
      a surface modifying agent applied on at least one surface of a substrate, the substrate is one or more battery separators,
      the surface modifying agent comprises a first portion comprising an aryl sulfonyl azide or a copolymer thereof and a second portion that comprises a chemical component capable of imparting a property to a surface of the substrate, the surface modifying agent is applied to the substrate in a weight range of 0.05-1.0 g/m$^2$, and at least one azide of the first portion has been reacted with a carbon atom of the substrate to form a sulfonamide linking group.

2. The battery of claim 1, wherein the azide is reacted with a carbon atom by exposing the first portion and the substrate to UV light.

3. The battery of claim 1, wherein the aryl sulfonyl azide is styrene sulfonyl azide.

4. The battery of claim 1, wherein the aryl sulfonyl azide is copolymerized with a vinylic monomer.

5. The battery of claim 4, wherein the vinylic monomer is hydrophilic.

6. The battery of claim 4, wherein the vinylic monomer is selected from the group consisting of a substituted styrene, acrylic acid, methacrylic acid, vinyl pyridine, vinyl pyrrolidone, acrylamide, methacrylamide, and salts thereof.

7. The battery of claim 4, wherein the vinylic monomer is substituted with a reactive group.

8. The battery of claim 4, wherein the vinylic monomer is hydrophobic.

9. The battery of claim 4, wherein the vinylic monomer is styrene sulfonate or a salt thereof.

10. The battery of claim 1 wherein the aryl sulfonyl azide is 4-styrene sulfonyl azide.

11. A battery comprising:
    an anode;
    a cathode;
    an electrolyte; and
    a surface modifying agent for modifying a surface of a battery separator, the surface modifying agent comprising:
       a first portion that comprises a sulfonyl azide and a second portion that comprises a chemical component capable of imparting a property to a surface of the substrate,
       the surface modifying agent is applied to the surface of the battery separator in a weight range of 0.05-1.0 g/m$^2$,
       the property is selected from the group consisting of hydrophilicity, hydrophobicity, oleophobicity, oleophilicity, fluorescence, increased or decreased surface energy, increased anti-fouling, and increased adhesion between the battery separator and another material.

12. The battery of claim 11 wherein the sulfonyl azide is 4-styrene sulfonyl azide.

* * * * *